US010567022B2

(12) United States Patent
Luo et al.

(10) Patent No.: US 10,567,022 B2
(45) Date of Patent: Feb. 18, 2020

(54) RADIO TRANSCEIVING DEVICE WITH MAIN AND AUXILIARY TRANSCEIVER AND METHODS PROVIDING INITIAL ACCESS

(71) Applicant: HUAWEI TECHNOLOGIES DUESSELDORF GMBH, Duesseldorf (DE)

(72) Inventors: Jian Luo, Munich (DE); Nikola Vucic, Munich (DE); Mario Castaneda, Munich (DE); Titos Kokkinos, Munich (DE)

(73) Assignee: HUAWEI TECHNOLOGIES DUESSELDORF GMBH, Duesseldorf (DE)

( * ) Notice: Subject to any disclaimer, the term of this patent is extended or adjusted under 35 U.S.C. 154(b) by 0 days.

(21) Appl. No.: 16/245,781

(22) Filed: Jan. 11, 2019

(65) Prior Publication Data
US 2019/0207636 A1  Jul. 4, 2019

Related U.S. Application Data

(63) Continuation of application No. PCT/EP2016/066716, filed on Jul. 14, 2016.

(51) Int. Cl.
*H04B 1/3805* (2015.01)
*H04B 7/06* (2006.01)
(Continued)

(52) U.S. Cl.
CPC ......... *H04B 1/3805* (2013.01); *H04B 7/0617* (2013.01); *H04B 7/0695* (2013.01); *H04W 84/042* (2013.01); *H04W 88/08* (2013.01)

(58) Field of Classification Search
CPC .. H04B 1/3805; H04B 7/0617; H04B 7/0695; H04B 7/0686
See application file for complete search history.

(56) References Cited

U.S. PATENT DOCUMENTS 7,684,761 B2 * 3/2010 Hottinen ............. H04B 7/0417
375/146
8,774,150 B1 * 7/2014 Jeffery ................ H04B 7/0617
370/338

(Continued)

OTHER PUBLICATIONS

"IEEE Standard for Information technology—Telecommunications and information exchange between systems—Local and metropolitan area networks—Specific requirements. Part 15.3: Wireless Medium Access Control(MAC) and Physical Layer (PHY) Specifications for High Rate Wireless Personal Area Networks (WPANs)—Amendment 2: Millimeter-wave-based Alternative Physical Layer Extension," IEEE 802.15.3c standard, IEEE Computer Society, pp. 1-203, Institute of Electrical and Electronics Engineers, New York, New York (Sep. 11, 2009).

(Continued)

*Primary Examiner* — Magdi Elhag
(74) *Attorney, Agent, or Firm* — Leydig, Voit & Mayer, Ltd.

(57) ABSTRACT

The disclosure relates to a radio transceiving device, comprising: a multi-antenna array; a main transceiver coupled to the multi-antenna array, wherein the main transceiver is configured to beamform a first plurality of digital signals over a total transceiver bandwidth, wherein a part of the beamforming is processed in digital domain and another part of the beamforming is processed in analog domain; and an auxiliary transceiver coupled to the multi-antenna array, wherein the auxiliary transceiver is configured to beamform a second plurality of digital signals over a fraction of the total transceiver bandwidth, wherein the beamforming is processed in digital domain.

18 Claims, 12 Drawing Sheets

(51) Int. Cl.
*H04W 88/08* (2009.01)
*H04W 84/04* (2009.01)

(56) References Cited

U.S. PATENT DOCUMENTS

| | | | |
|---|---|---|---|
| 10,117,113 B2* | 10/2018 | Braun | H04B 7/0617 |
| 2013/0301552 A1 | 11/2013 | Xu et al. | |
| 2015/0117435 A1 | 4/2015 | Baldemair et al. | |
| 2015/0257175 A1 | 9/2015 | Ma et al. | |
| 2016/0142922 A1 | 5/2016 | Chen et al. | |
| 2018/0183509 A1* | 6/2018 | Luo | H04B 7/002 |
| 2018/0343679 A1* | 11/2018 | Sahlin | H04W 16/28 |
| 2019/0081684 A1* | 3/2019 | da Silva | H04L 5/005 |

OTHER PUBLICATIONS

"IEEE Standard for Information technology—Telecommunications and information exchange between systems—Local and metropolitan area networks—Specific requirements. Part 11: Wireless LAN Medium Access Control (MAC) and Physical Layer (PHY) Specifications—Amendment 3: Enhancements for Very High Throughput in the 60 GHz Band," IEEE 802.11ad standard, IEEE Computer Society, pp. 1-628, Institute of Electrical and Electronics Engineers, New York, New York (Oct. 19, 2012).

Torkildson "Millimeter Wave MIMO: Design and Evaluation of Practical System Architectures," University of California, Santa Barbara, pp. 1-124 (Dec. 2010).

Nitsche et al.,"Steering with Eyes Closed: mm-Wave Beam Steering without In-Band Measurement," pp. 1-9 (Apr. 26-May 1, 2015).

Zou et al.,"A Unified Codebook for Fast Beam Searching in Millimeter-wave Communications," ICCP2012 Proceedings, pp. 218-223, Institute of Electrical and Electronics Engineers, New York, New York (2012).

* cited by examiner

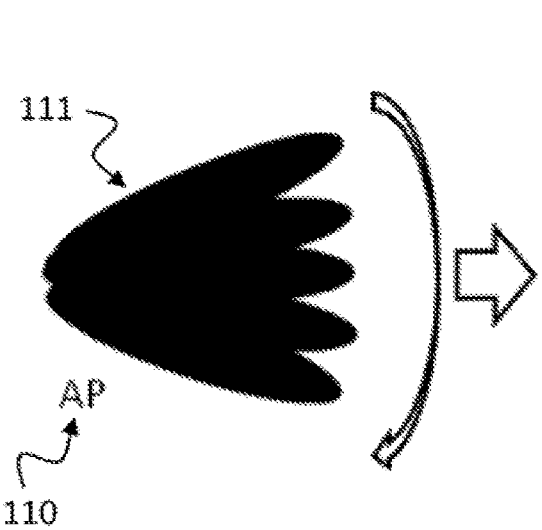
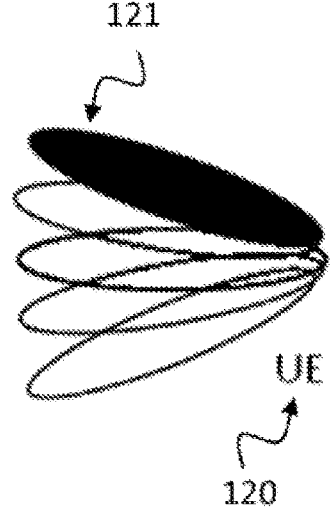
Fig. 1a
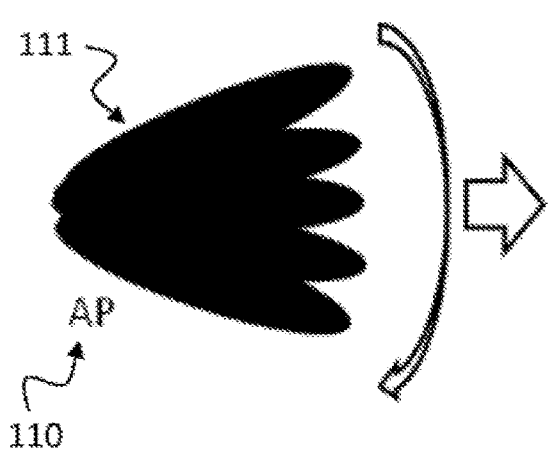
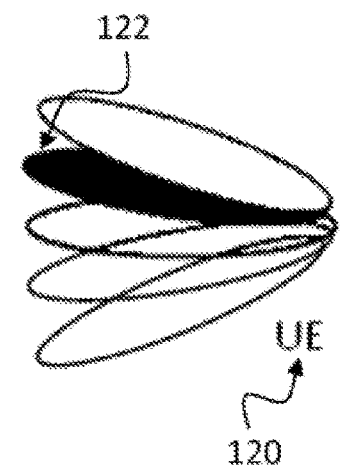
Fig. 1b

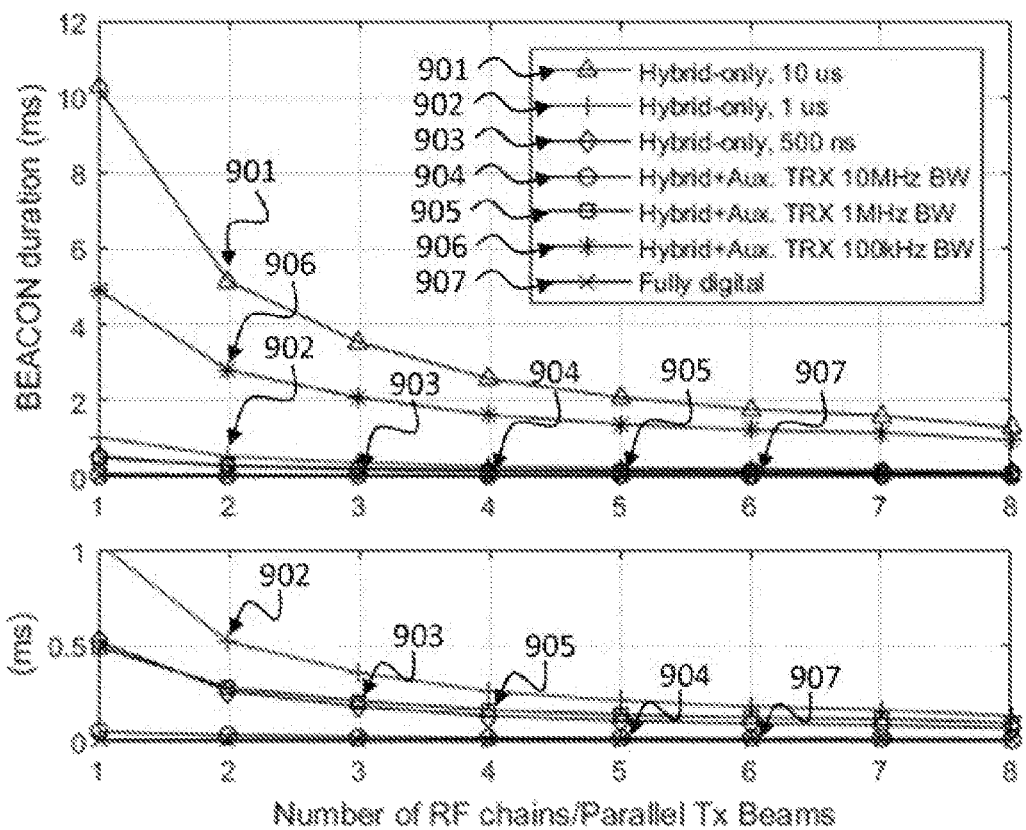

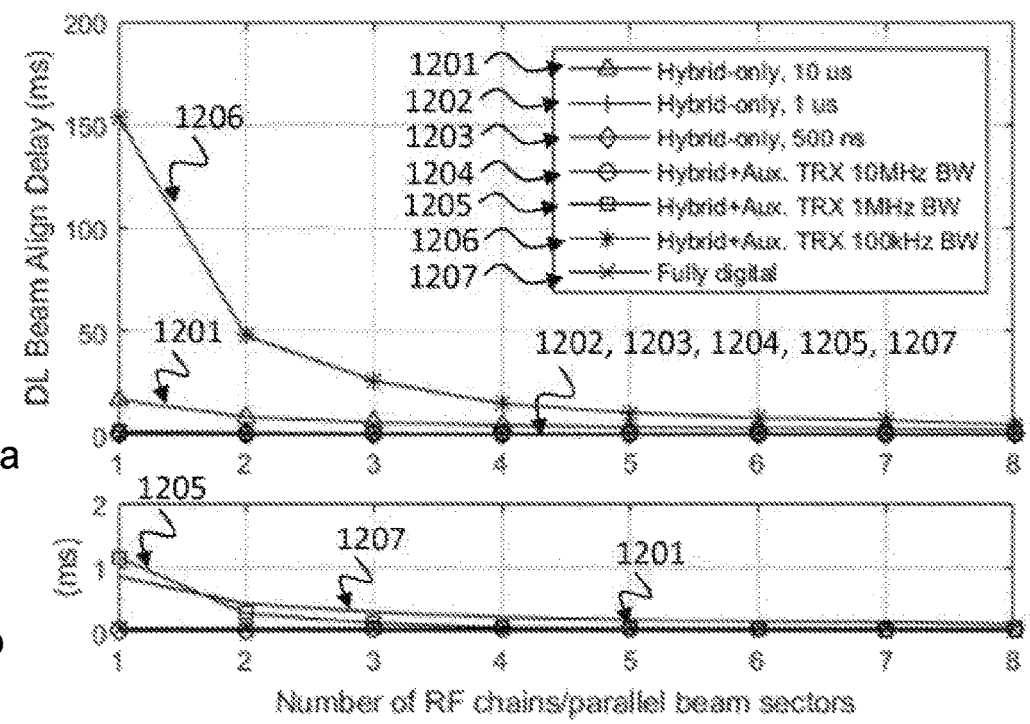
Fig. 12a
Fig. 12b
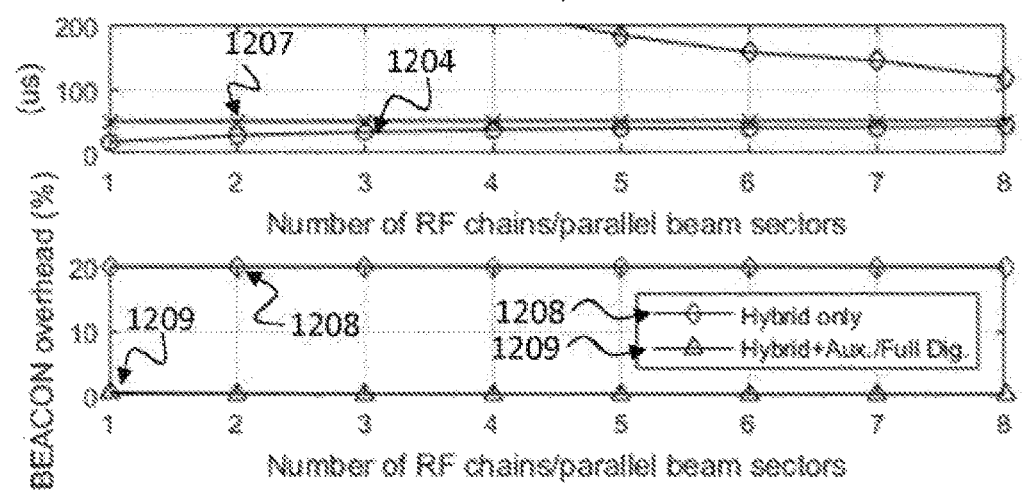
Fig. 12c
Fig. 12d

RADIO TRANSCEIVING DEVICE WITH MAIN AND AUXILIARY TRANSCEIVER AND METHODS PROVIDING INITIAL ACCESS

CROSS-REFERENCE TO RELATED APPLICATIONS

This application is a continuation of International Application No. PCT/EP2016/066716, filed on Jul. 14, 2016, the disclosure of which is hereby incorporated by reference in its entirety.

TECHNICAL FIELD

The present disclosure relates to a radio transceiving device with main and auxiliary transceiver coupled to a multi-antenna array, in particular for Initial Access of millimetre-wave (mm-wave) networks. The disclosure further relates to methods for providing initial access between a user equipment (UE) and an access point (AP), in particular for mm-wave networks. In particular, the disclosure relates to the initial access procedure of a UE to a millimetre-wave AP, including broadcast signalling, cell detection, beam alignment and random access.

BACKGROUND

The initial access procedure for providing initial access 100 for a user equipment (UE) 120 to an access point (AP) 110, e.g. a radio cell or a base station, an example of which is illustrated in FIG. 1, includes the following steps: broadcast signalling, cell detection, beam alignment and random access. Before the beams 111, 121 of the AP 110 and the UE 120, respectively, are aligned, beam scanning has to be done, which can consume a considerable amount of radio resources (time, frequency). For example, when a hybrid beamforming transceiver architecture is applied, both TX and RX need to switch beams via analog circuits (e.g. the configuration of analog phase shifters). Such analog beam switching can be quite slow, e.g. requires 500 nano seconds (ns) to 1 micro seconds (us) (depending on implementation). This means that guard intervals (GI) of 500-1 us have to be reserved between the transmission of different beams 121, 122. During such GI, no signal is transmitted and received. As a result, the system will have signaling overhead and high latency of user access, i.e. long user waiting time.

SUMMARY

It is the object of the application to provide technology for an improved access procedure between a user equipment and an access point.

This object is achieved by the features of the independent claims. Further implementation forms are protected by the dependent claims, the description and the figures.

A basic idea of the application is to design a new transceiver architecture that includes a hybrid wideband transceiver as the main transceiver and an auxiliary fully digital narrow-band transceiver. The signal bandwidth is divided into two parts: One wide bandwidth part for general data transmission by the main transceiver under hybrid beamforming constraints; and one narrow bandwidth part (e.g. 1 MHz) for initial access and other optional tasks, e.g. small packet transmission by the auxiliary transceiver with fully digital multiple input multiple output (MIMO) capability. In other words, the auxiliary transceiver operates in a narrow subband of the overall bandwidth, and is responsible for initial access and other optional tasks, e.g. small packet transmission.

For initial access, the auxiliary transceiver performs fast TX beam scanning as well as RX beam forming using advanced fully digital MIMO techniques, e.g. Angle-of-Arrival (AoA) estimation. During initial access of some UE's, the data transmissions for other UE's do not need to be interrupted. After the auxiliary transceivers assist the AP and UE's to find the best beam directions, the optimal beam forming coefficients are calculated for the hybrid transceiver based on such beam directions. Based on the above new transceiver architecture and functional split between the hybrid wideband transceiver and the auxiliary fully digital narrow-band transceiver, the corresponding frame structures and protocols are introduced for initial access in the following four scenarios: 1) Single cell stand-alone mm-wave network; 2) Multi-cell stand-alone mm-wave network; 3) Single cell overlay mm-wave network; 4) Multi-cell overlay mm-wave network; where single- or multi-cell refers to the cases where a UE performs initial access with a single- or multiple mm-wave AP's, respectively. Furthermore, stand-alone or overlay means that the initial access procedure is done without or with assistance from a sub-6 GHz wide area network, respectively.

In order to describe the application in detail, the following terms, abbreviations and notations will be used:
TDD: time-division duplexing
FDD: frequency-division duplexing
UL: uplink
DL: downlink
RX: receive
TX: transmit
UE: user equipment, mobile terminal
AP: access point, e.g. radio cell or base station
GI: guard interval
BS: base station, serving radio cell
FDMA: Frequency Division Multiple Access
TDMA: Time Division Multiple Access
MaBS: macro base station
OFDM: orthogonal frequency division multiplex
MIMO: multiple input multiple output
LTE: long term evolution
ADC: analog-to-digital converter
DAC: digital-to-analog converter
WLAN: wireless local area network
WPAN: wireless personal area network
AoA: Angle-of-Arrival
RACH: Random Access Channel According to a first aspect, the application relates to a radio transceiving device, comprising: a multi-antenna array; a main transceiver coupled to the multi-antenna array, wherein the main transceiver is configured to beamform a first plurality of digital signals over a total transceiver bandwidth, wherein a part of the beamforming is processed in digital domain and another part of the beamforming is processed in analog domain; and an auxiliary transceiver coupled to the multi-antenna array, wherein the auxiliary transceiver is configured to beamform a second plurality of digital signals over a fraction of the total transceiver bandwidth, wherein the beamforming is processed in digital domain.

This provides the advantage that the main transceiver can be implemented by a hybrid wideband transceiver and the auxiliary transceiver by a fully digital narrow-band transceiver. The signal bandwidth can be divided into two parts where one wide bandwidth part can be used for general data transmission by the main transceiver under hybrid beamforming constraints; while one narrow bandwidth part (e.g. 1 MHz) can be used for initial access and other optional tasks such as small packet transmission etc. The auxiliary transceiver has fully digital MIMO capability and operates in a narrow subband of the overall bandwidth, i.e. referred herein as the fraction of the total transceiver bandwidth.

The main transceiver has a hybrid beamforming architecture where both TX and RX switch beams via analog circuits, e.g. by using analog phase shifters and/or analog amplifiers. Digital processing chains using digital-to-analog converters (DACs), analog-to-digital converters (ADCs), and digital signal processing units are used to couple the processed signals, e.g. if at Tx, a plurality of digital signals consisting of weighted combinations of data streams, via the analog processing chains to the multi-antenna array. If at Rx, the analog beamformed signals (output of phase shifters) are coupled to the ADCs for further processing in digital domain.

The architecture of this application has the advantage that a slow analog beam switching of the main transceiver due to settling times and latencies of the analog components, can be counterbalanced by the fully digital auxiliary transceiver. The auxiliary transceiver has due to its fully digital MIMO capability no need to reserve guard intervals, such as 500 nano seconds (ns) to 1 micro seconds (us) for example, between transmissions with different beam directions. Although the auxiliary transceiver operates only over a small bandwidth, i.e. the fraction of the total transceiver bandwidth, it is fast enough to enable initial access and further relevant tasks of a MIMO transceiver to accelerate operation times. For initial access, the auxiliary transceiver performs fast TX beam scanning as well as RX beam forming using advanced fully digital MIMO techniques, such as Angle-of-Arrival (AoA) estimation. After the auxiliary transceiver assists the AP and UE's to find the best beam directions, the optimal beam forming coefficients can be calculated for the hybrid transceiver based on such beam directions. This can be done in the digital domain.

In a first possible implementation form of the radio transceiving device according to the first aspect, the auxiliary transceiver is configured to provide initial access for a user equipment to an access point; and the main transceiver is configured to perform user data transmission between the user equipment and the access point.

This provides the advantage that initial access can be performed over the fraction of the total transceiver bandwidth, i.e. the small bandwidth. When using the fraction of the total transceiver bandwidth, the signaling overhead for initial access can be reduced. During initial access of some UE's, the data transmissions for other UE's do not need to be interrupted. By using the auxiliary transceiver for initial access, interruption-free data transmission for the other UEs can be guaranteed.

In a second possible implementation form of the radio transceiving device according to the first aspect as such or according to the first implementation form of the first aspect, auxiliary transceiver is configured to provide the initial access for the user equipment to the access point based on aligning at least one beam of the user equipment with at least one beam of the access point.

This provides the advantage that the auxiliary transceiver can assist the AP and UE's to find the best beam directions which accelerates calculating the optimal beam forming coefficients for the hybrid transceiver based on such beam directions. Based on this new transceiver architecture and functional split between the hybrid wideband transceiver and the auxiliary fully digital narrow-band transceiver, the corresponding frame structures and protocols can be introduced for initial access in the following four scenarios: 1) Single cell stand-alone mm-wave network; 2) Multi-cell stand-alone mm-wave network; 3) Single cell overlay mm-wave network; 4) Multi-cell overlay mm-wave network; where single- or multi-cell refers to the cases where a UE performs initial access with a single- or multiple mm-wave AP's, respectively. Furthermore, stand-alone or overlay means that the initial access procedure is done without or with assistance from a sub-6 GHz wide area network, respectively.

In a third possible implementation form of the radio transceiving device according to the first aspect as such or according to any of the preceding implementation forms of the first aspect, the auxiliary transceiver is configured to provide small packet transmission.

This provides the following advantage: Some control signaling or Machine-to-Machine (M2M) related traffic just require small packets to be transmitted. With the hybrid beamforming architecture and Time Division Multiple Access (TDMA) between users, the whole bandwidth have to be used for such small packets, causing waste of resource. Using the full-digital auxiliary transceiver operating on the fraction of the total transceiver bandwidth can avoid such waste since the rest of the bandwidth can be used for normal data transmission of other users.

In a fourth possible implementation form of the radio transceiving device according to the first aspect as such or according to any of the preceding implementation forms of the first aspect, the main transceiver and the auxiliary transceiver are configured to share the total transceiver bandwidth based on frequency division multiple access (FDMA) on demand, in particular during initial access or small packet transmission; and otherwise to assign the total transceiver bandwidth to the main transceiver.

This provides the advantage of high flexibility to transmission bandwidth requirements. When the auxiliary transceiver needs the bandwidth, the required bandwidth (i.e. required the fraction of the total transceiver bandwidth) is provided, otherwise the main transceiver can use the full transceiver bandwidth.

In a fifth possible implementation form of the radio transceiving device according to the first aspect as such or according to any of the preceding implementation forms of the first aspect, the main transceiver comprises a plurality of analog processing chains, in particular analog phase shifters coupled to the multi-antenna array and a plurality of digital processing chains, in particular digital-to-analog converters (DACs) and/or analog-to-digital converters (ADCs) coupled via the analog processing chains to the multi-antenna array, wherein a number (M) of the digital processing chains is smaller than a number (N) of the analog processing chains.

This provides the advantage that the main transceiver can perform both analog beamforming by using the analog processing chains and digital beamforming by using the digital processing chains. The smaller number M of digital processing chains results in reduced complexity for the main transceiver because a lot of beamforming processing can be performed in the analog domain where the beamformed signals can be directly coupled to the multi-antenna array without the requirement of additional costly ADCs and/or DACs.

In a sixth possible implementation form of the radio transceiving device according to the fifth implementation form of the first aspect, the auxiliary transceiver comprises a plurality of digital processing chains, in particular DACs and/or ADCs, wherein a quantization resolution of the DACs and/or ADCs of the auxiliary transceiver is lower than a quantization resolution of the DACs and/or ADCs of the main transceiver.

This provides the advantage that the auxiliary transceiver can be designed with a lower complexity. Due to the reduced bandwidth compared to the bandwidth of the full transceiver, the complexity and costs of the DACs/ADCs of auxiliary transceiver can be reduced. This reduces complexity and costs for the new transceiver architecture.

In a seventh possible implementation form of the radio transceiving device according to any of the fifth or the sixth implementation forms of the first aspect, each digital processing chain of the main transceiver is connected to all antenna elements of the multi-antenna array via the analog phase shifters; or each digital processing chain of the main transceiver is connected to a subset of the antenna elements of the multi-antenna array via the analog phase shifters.

The first alternative provides the advantage that the full antenna gain of the overall array can be used by each digital processing chain, since each digital processing chain is connected to all antenna elements. The second alternative provides the advantage that the complexity and costs of the main transceiver can be reduced. Both alternatives provide flexibility in the design of the radio transceiving device.

In an eighth possible implementation form of the radio transceiving device according to any of the fifth to the seventh implementation forms of the first aspect, the auxiliary transceiver is only coupled to a subset of the antenna elements of the multi-antenna array.

This provides the advantage of reduced complexity and reduced costs. Since only rough beam alignment is required during initial access, the reduced precision of determined beam direction due to reduce number of antenna elements that are used by the auxiliary transceiver is acceptable.

According to a second aspect, the application relates to a method for providing initial access between a user equipment (UE) and an access point (AP), the method comprising: transmitting a plurality of broadcast signals in different beam directions by the AP by using a fraction of a total transceiver bandwidth of the AP, wherein the plurality of broadcast signals comprise information about a beam sector identifier and a cell identifier of the AP; receiving at least part of the broadcast signals by the UE by using a fraction of a total transceiver bandwidth of the UE; and determining a preferential beam direction by the UE based on at least part of the broadcast signals received from the AP.

This provides the advantage that the initial access does not interrupt the normal data transmission. Furthermore, using narrow band for initial access allows fully digital implementation of the auxiliary transceiver with reasonable cost and complexity. Fully digital implementation allows faster scanning of beams.

Such a method has the advantage that a slow analog beam switching due to settling times and latencies of the analog beamforming can be counterbalanced by performing the initial access over a small bandwidth, i.e. the fraction of the total transceiver bandwidth and by using fully digital processing.

In a first possible implementation form of the method according to the second aspect, the method comprises: determining beamforming coefficients by the UE for the preferential beam direction; and transmitting a user data signal or a control signal over the total transceiver bandwidth of the UE by using the beamforming coefficients determined by the UE.

This provides the advantage that the calculation of the beamforming coefficients can be accelerated because only the fraction of the total transceiver bandwidth is required for determining the beamforming coefficients. These beamforming coefficients calculated over the small bandwidth can be used to derive the coefficients for the full bandwidth.

In a second possible implementation form of the method according to the second aspect as such or according to the first implementation form of the second aspect, the method comprises: scanning in different beam directions by the AP by using the fraction of the total transceiver bandwidth of the AP to detect an access request of the UE; determining beamforming coefficients by the AP based on the detected access request of the UE; and transmitting a user data signal or a control signal over the total transceiver bandwidth of the AP by using the beamforming coefficients determined by the AP.

This provides the advantage that the detecting an access request can be performed over the fraction of the total transceiver bandwidth which saves transmission resources. The beamforming coefficients computed based on the fraction of the total transceiver bandwidth can be used to derive the coefficients for the full bandwidth.

In a third possible implementation form of the method according to the second aspect as such or according to any of the preceding implementation forms of the second aspect, the method comprises: using an auxiliary transceiver of a first radio transceiver device according to the first aspect as such or any of the preceding implementation forms of the first aspect for transmitting the plurality of broadcast signals by the AP; and using an auxiliary transceiver of a second radio transceiver device according to the first aspect as such or any of the preceding implementation forms of the first aspect for receiving the at least part of the broadcast signals by the UE.

This provides the advantage that the normal data transmission is not interrupted by the initial access procedure.

In a fourth possible implementation form of the method according to the second aspect as such or according to any of the preceding implementation forms of the second aspect, the determining the preferential beam direction for the AP is assisted by a base station (BS) comprising a BS transceiver operating on a different frequency, in particular a lower frequency than a frequency of the AP, wherein the assistance by the base station comprises signaling of corresponding control information by using the BS transceiver.

This provides the advantage that this method can be flexibly applied in a variety of different scenarios, where single cell overlay mm-wave networks and multi-cell overlay mm-wave networks are two such examples.

In a fifth possible implementation form of the method according to the fourth implementation form of the second aspect, the method comprises: determining a set of preambles, each associated to an AP, by the base station, in particular based on location information of the UE; and transmitting the set of preambles from the base station to the UE.

This provides the advantage that this method can also be applied in multi-cell networks where different preambles can be determined for respective access points. With assistance of the BS, the number of preambles to be tried by the UE during initial access can be reduced.

In a sixth possible implementation form of the method according to any of the fourth or the fifth implementation forms of the second aspect, the method comprises: transmitting a plurality of broadcast signals in different beam directions by a plurality of the APs by using a fraction of a total transceiver bandwidth of the APs; receiving at least part of the broadcast signals by the UE by using a fraction of a total transceiver bandwidth of the UE; determining a preferential AP of the plurality of APs based on at least part of the broadcast signals received from the APs; and transmitting an access request by the UE to the preferential AP.

This provides the advantage that the broadcast signals for determining the preferential access point can be transmitted by using the small bandwidth, i.e. fraction of the total transceiver bandwidth, which results in reduced complexity and overhead for each of the signals transmitted to an AP.

In a seventh possible implementation form of the method according to the sixth implementation form of the second aspect, the determining the preferential AP is assisted by the base station where the BS transceiver operates on a different frequency, in particular a lower frequency than each of the APs.

This provides that advantage that this initial access procedure can be applied in overlay networks, e.g. where the BS transceiver is an LTE transceiver and where the main and auxiliary transceivers are mm-wave transceivers. Furthermore, the lower frequency links usually have higher reliability and are suitable for the transmission of control information for initial access.

In an eighth possible implementation form of the method according to any of the sixth or the seventh implementation forms of the second aspect, the broadcast signals of different access points comprise different preambles that are orthogonal to each other.

This provides the advantage that the method can easily discriminate between different access points by only evaluating their preambles.

In a ninth possible implementation form of the method according to any of the sixth to the eighth implementation forms of the second aspect, the method comprises: determining a second and third preferential AP of the plurality of APs together with their beam sector identifiers and cell identifiers based on at least part of the broadcast signals received from the APs; and transmitting the beam sector identifiers and cell identifiers of the second and third preferential AP to the base station.

This provides the advantage that backup APs can be kept in record, and in case of link interruption e.g. due to blockage, the UE can quickly switch to the second or third AP.

In a tenth possible implementation form of the method according to the second aspect as such or according to any of the preceding implementation forms of the second aspect, the method comprises: sending an access request by the UE to the AP by using the preferential beam direction, wherein a Random Access CHannel (RACH) for sending the access request is located within the fraction of the total transceiver bandwidth of the UE.

This provides the advantage that the RACH does not interrupt the normal data transmission, and that the random access procedure can be handled by the auxiliary transceivers.

According to a third aspect, the application relates to a transceiver architecture that consists of a hybrid wideband transceiver as the main transceiver and an auxiliary fully digital narrow-band transceiver. The main transceiver and the auxiliary transceiver share the signal bandwidth in the following way: The main transceiver is responsible for general data transmission in a wideband part of the signal bandwidth under hybrid beamforming constraints; The auxiliary transceiver is responsible for initial access and other optional tasks e.g. small packet transmission in a narrow bandwidth part (e.g. 1 MHz) of the signal bandwidth and can use fully digital MIMO techniques; When the auxiliary transceiver is in operation, the main transceiver and the auxiliary transceiver work simultaneously in an FDMA (frequency division multiple access) manner as described above. When the auxiliary transceiver is not in operation, the main transceiver operates in the whole signal bandwidth. Optionally, the DAC/ADC's of the auxiliary transceiver can have lower quantization resolution than that of the main transceiver.

According to a fourth aspect, the application relates to a frame structure that divides the signal bandwidth into a wideband part and a narrow band part, with the narrow band part responsible for initial access. Initial access BEACON's are transmitted in the narrow band part periodically.

According to a fifth aspect, the application relates to a signaling process of mm-wave initial access consisting of: Sending of BEACON's in different beam sectors by the auxiliary Tx of the AP; Scanning of all possible Rx beam directions simultaneously by the auxiliary Rx of the UE; Sending of initial access request of the auxiliary Tx of the UE using the best Rx beam direction; Scanning of all possible Rx beam directions simultaneously by the auxiliary Rx of the AP to detect UE initial request during RACH; Computation of beamforming coefficients at AP/UE for the main transceiver based on the best beam directions identified by the auxiliary transceiver;

According to a first implementation form of the fifth aspect, when multiple AP's having overlapping coverage, the signaling process of mm-wave initial access consisting of: Sending of orthogonal preambles in the BEACON's of different AP's via auxiliary Tx; Scanning of all possible Rx beam directions simultaneously by the auxiliary Rx of the UE and detection of all possible preambles; Selection of the best AP by the UE based on highest SNR; Recording of backup AP ID and the corresponding best beam sectors by the UE; Optionally, sending of BEACON's in different narrow band channels by different AP's. Cell detection is done by UE at all possible narrow band channels.

According to a second implementation form of the fifth aspect, in overlay networks, the signaling process of mm-wave initial access consisting of: Sending of the starting time of the BEACON from the MaBS (Master BS) to the UE via a sub-6 GHz link; Feedback of detected mmAP cell ID and best beam sector ID to MaBS via a sub-6 GHz link; Sending of a list of mmAP candidates from the MaBS to the UE; Sending of a list of detected mmAP cell ID's (and their best beam sector ID's) from the UE to the MaBS. The list is in the order of Rx SNR of the signals from the corresponding mmAP's; Selection of the best mmAP for the UE by the MaBS; Optional: Sending by the MaBS the narrow band frequencies of the mmAP's for initial access to the UE.

BRIEF DESCRIPTION OF THE DRAWINGS

Further embodiments of the invention will be described with respect to the following figures, in which:

FIG. 1a and FIG. 1b show a schematic diagram illustrating a method of beam alignment 100 between an Access Point (AP) and a User Equipment (UE);

FIGS. 9a and 9b show diagrams illustrating an exemplary BEACON duration of different schemes;

FIGS. 12a, 12b, 12c and 12d show diagrams illustrating an exemplary DL beam alignment average delay assuming 20% BEACON overhead for all hybrid-only schemes. The overheads of the hybrid and auxiliary scheme and fully digital scheme are much lower.

DETAILED DESCRIPTION OF EMBODIMENTS

Figure 2:
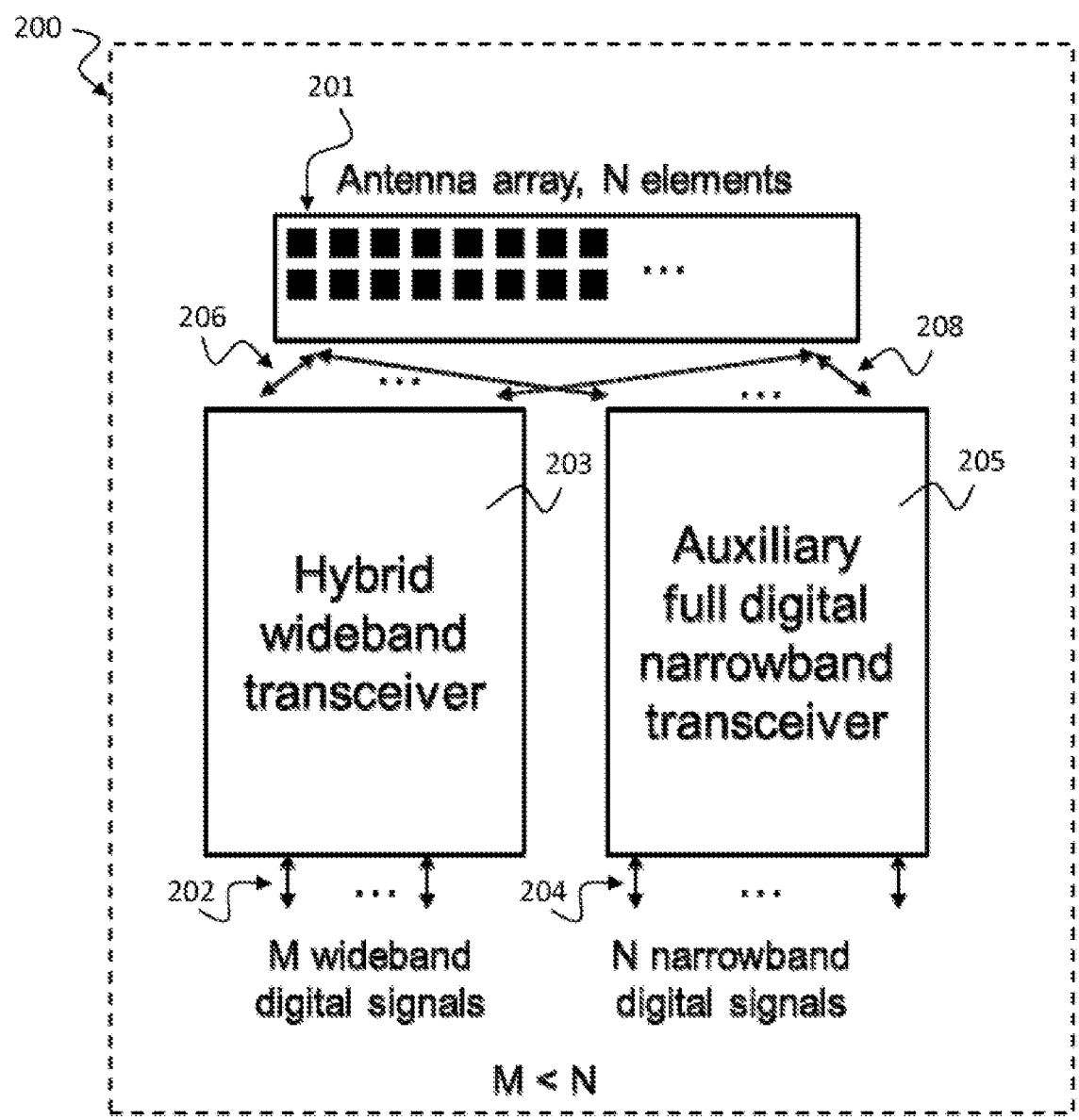
FIG. 2 shows a block diagram illustrating a radio transceiving device 200 according to an implementation form.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described device, circuit or system may also hold true for a corresponding method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on mobile communication standards such as LTE, in particular LTE-A and/or OFDM, as used in 4G and 5G networks, for example. The methods and devices described below may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The devices and methods described hereinafter may be applied in MIMO systems. Multiple-input multiple-output (MIMO) wireless communication systems employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band.

The devices and methods described herein after may be designed in accordance to mobile communication standards such as e.g. the Long Term Evolution (LTE) standard or the advanced version LTE-A thereof. LTE (Long Term Evolution), marketed as 4G, 5G LTE and beyond, is a standard for wireless communication of high-speed data for mobile phones and data terminals.

The devices and methods described hereinafter may be applied in LTE TDD mode and LTE FDD mode systems, e.g. LTE FDD mode systems having a type 1 LTE frame structure or LTE TDD mode systems having a type 2 LTE frame structure. Note that LTE has currently no mm-wave component. However 5G or planned LTE-extension for mm-wave will have such mm-wave component.

The devices and methods described hereinafter may be applied in millimeter-wave networks. Mm-wave frequencies offer high potential for 5G high data rate transmission, due to the large available amount of contiguous spectrum. However, due to increased free space path loss, mm-wave transmission highly relies on highly directional links, which requires large number of antennas. On the one hand, for realizing transceivers with such large number of antennas with a fully digital architecture, very high hardware complexity and power consumption are required. Therefore, a more realistic way to implement mm-wave transceivers is to apply the so called "hybrid digital-analog transceiver architecture", which has a part of multi-antenna signal processing (e.g. beamforming) in analog domain, while having other signal processing in digital domain. A typical example is that phase shifters are in analog domain, e.g. at baseband, intermediate frequency (IF) or radio frequency (RF), to do the processing for beamforming, which requires different processing per antenna. The rest of signal processing that does not require different processing per antenna can be done in the digital domain. In this way, the number of digital-to-analog converters (DAC) and analog-to-digital converters (ADC) as well as the number of RF chains can be significantly reduced. On the other hand, due to highly directional links, initial access becomes challenging, i.e. the transmitter (Tx) and the receiver (Rx) need to align their beams when they search each other and want to exchange control information.

Inn sub-6 GHz networks such as LTE, for example, the initial access is based on omni-directional transmission or sector-wide antenna pattern based transmission of broadcast signals. Since LTE has been designed for the operation at sub-6 GHz frequency, which has much lower free space path loss than mm-wave frequencies, the UE's can detect the broadcasted control signals for initial access without the need for to beamforming and beam alignment. In wireless personal area networks (WPAN), e.g. according to "Draft Standard for Information Technology-Telecommunications and Information Exchange Between Systems-Local and Metropolitan Area Networks-Specific Requirements-Part 11: Wireless LAN Medium Access Control (MAC) and Physical Layer (PHY) Specifications-Amendment 4: Enhancements for Very High Throughput in the 60 GHz Band, IEEE P802.11ad/D9.0, October 2012" and in wireless local area network (WLAN) networks, e.g. according to the standard "IEEE 802.15 WPAN Millimeter Wave Alternative PHY Task Group 3c (TG3c)", the usage of the 60 GHz band is assumed, and beamforming is required. Thus, for the initial access, beam alignment procedures have been proposed in both standards. In 802.15.3c, exhaustive search of Tx and Rx beams is carried out, while in 802.11ad, multi-step linear beam sweeping is used. Devices and methods according to the disclosure provide improved communication over the above described techniques.

The devices and methods described hereinafter may transmit beacon frames. Beacons are management frames containing information about the network. Radio devices scan all RF channels searching for beacons announcing the presence of a nearby access point. When a radio device receives a beacon frame, it receives information about the capabilities and configuration of that network, and is also then able to provide a list of available eligible networks, sorted by signal strength. This allows the device to choose to connect to the optimal network.

The devices and methods described hereinafter may be used for initial access and small packet transmission. To overcome the high isotropic pathloss experienced at millimeter-wave frequencies (roughly above 10 GHz), high directionality is required at both the base station and the UE to establish sufficient link budget in wide area networks. Initial access (IA) allows a UE to establish a physical link connection with a base station (BS) that is a necessary step to access the network. In order to overcome the increased isotropic pathloss experienced at higher frequencies, in 5G mm-Wave cellular systems the IA procedure provides a mechanism by which the BS and the UE can determine suitable initial directions of transmission, i.e. for finding the proper alignment for directional transmission and reception.

FIG. 2 shows a block diagram illustrating a radio transceiving device 200 according to an implementation form. The radio transceiving device 200 includes a multi-antenna array 201, a main transceiver 203 coupled to the multi-antenna array 201 and an auxiliary transceiver 205 coupled to the multi-antenna array 201.

The main transceiver 203 is configured to beamform a first plurality of digital signals 202 over a total transceiver bandwidth. A part of the beamforming of the main transceiver 203 is processed in digital domain and another part of the beamforming of the main transceiver 203 is processed in analog domain. The auxiliary transceiver 205 is configured to beamform a second plurality of digital signals 204 over a fraction of the total transceiver bandwidth. The beamforming of the auxiliary transceiver 205 is processed in digital domain.

The main transceiver 203 can be implemented by a hybrid wideband transceiver and the auxiliary transceiver 205 can be implemented by an auxiliary fully digital narrow-band transceiver. The signal bandwidth can be divided into two parts where one wide bandwidth part, i.e. the total transceiver bandwidth can be used for general data transmission by the main transceiver 203 under hybrid beamforming constraints; while one narrow bandwidth part, i.e. the fraction of the total transceiver bandwidth (e.g. 1 MHz) can be used for initial access and other optional tasks such as small packet transmission etc. The auxiliary transceiver 205 has fully digital MIMO capability and operates in a narrow subband of the overall bandwidth, i.e. the fraction of the total transceiver bandwidth.

The main transceiver 203 has a hybrid beamforming architecture where both TX and RX switch beams via analog circuits, e.g. by using analog phase shifters and/or analog amplifiers. Digital processing chains using digital-to-analog converters (DACs), analog-to-digital converters (ADCs), digital amplifiers and digital signal processing units are used to couple the processed signals, e.g. if at Tx, a plurality of digital signals consisting of weighted combinations of data streams, via the analog processing chains to the multi-antenna array. If at Rx, the analog beamformed signals (output of phase shifters) are coupled to the ADC's for further processing in digital domain.

Hence, a slow analog beam switching of the main transceiver 203 due to settling times and latencies of the analog components, can be counterbalanced by the fully digital auxiliary transceiver 205. The auxiliary transceiver 205 has due to its fully digital MIMO capability no need to reserve long guard intervals such as 500 nano seconds (ns) to 1 micro seconds (us) for example. Although the auxiliary transceiver 205 operates only over a small bandwidth, i.e. the fraction of the total transceiver bandwidth, it is fast enough to enable initial access and further relevant tasks of a MIMO transceiver to accelerate operation times. For initial access, the auxiliary transceiver 205 performs fast TX beam scanning as well as RX beam forming using advanced fully digital MIMO techniques, such as Angle-of-Arrival (AoA) estimation. After the auxiliary transceiver 205 assists the AP and UE's to find the best beam directions, the optimal beam forming coefficients can be calculated for the hybrid transceiver based on such beam directions. This can be done in the digital domain.

The auxiliary transceiver 205 may provide initial access for a user equipment to an access point, e.g. a UE 120 and an AP 110 as described in the beam alignment scenario according to FIG. 1. The main transceiver 203 may perform user data transmission between the user equipment 120 and the access point 110. The auxiliary transceiver 205 may provide the initial access for the user equipment 120 to the access point 110 based on aligning at least one beam 121 of the user equipment 120 with at least one beam 111 of the access point 110. The auxiliary transceiver 205 may be used for providing small packet transmission. The main transceiver 203 and the auxiliary transceiver 205 may share the total transceiver bandwidth based on frequency division multiple access (FDMA) on demand, for example during initial access procedure or small packet transmission. Otherwise the total transceiver bandwidth can be assigned to the main transceiver 203.

The main transceiver 203 can have a plurality of analog processing chains, in particular analog phase shifters coupled to the multi-antenna array 201 and a plurality of digital processing chains, in particular digital-to-analog converters DACs and/or analog-to-digital converters ADCs coupled via the analog processing chains to the multi-antenna array 201. In one exemplary implementation, a number M of the digital processing chains can be smaller than a number N of the analog processing chains.

The auxiliary transceiver 205 can have a plurality of digital processing chains, in particular DACs and/or ADCs.

In one exemplary implementation, a quantization resolution of the DACs and/or ADCs of the auxiliary transceiver 205 can be lower than a quantization resolution of the DACs and/or ADCs of the main transceiver 203.

Each digital processing chain of the main transceiver 203 may be connected 206 to all antenna elements of the multi-antenna array 201 via the analog phase shifters. Alternatively, each digital processing chain of the main transceiver 203 may be connected 206 to a subset of the antenna elements of the multi-antenna array 201 via the analog phase shifters. In one implementation form, the auxiliary transceiver 205 may be only coupled 208 to a subset of the antenna elements of the multi-antenna array 201.

In the following, an exemplary structure for a new transceiver architecture and the corresponding initial access procedure based on this new transceiver architecture is introduced.

In the following implementation, the mm-wave device (AP or UE) has an antenna array 201 with N elements. Two transceivers 203, 205 are connected with the antenna array 201. The first one is a main transceiver 203 for usual high throughput data transmission. This main transceiver 203 has a hybrid analog and digital architecture, i.e., it has N analog phase shifters or analog processing chains (for the purpose of beamforming/beam-steering) connected to the antenna elements and M RF chains and digital chains (incl. wideband DAC, ADC), with M<N. The analog phase shifters can be implemented in RF, IF or baseband. Furthermore, the hybrid architecture of the main transceiver 203 can be a shared array architecture or a sub-array architecture. A shared array architecture means that each digital chain is connected to all antenna elements via phase shifters, and thus requires M×N phase shifters. A sub-array architecture means that each digital chain is only connected to a subset of the antenna elements via phase shifters, and thus requiring only N phase shifters. A further option is a mixture between shared array and sub-array architectures, where some antenna elements are connected to multiple digital chains and the others only connected to one digital chain each. In this case, the required number of phase shifters is between N and M×N.

The second one is an auxiliary transceiver 205 that has a fully digital architecture, i.e. that there are N narrowband RF chains and digital chains (incl. narrow band DAC, ADC), each of which coupled to an antenna element. This auxiliary transceiver 205 is responsible for the initial access procedure and some optional tasks e.g. transmission of small packets and control information.

As an alternative, the auxiliary transceiver 205 can have less than N narrowband RF/digital chains and is coupled to a selected subset of antenna elements. A further alternative is that the DAC and ADC of the auxiliary transceiver 205 can have low quantization resolution (e.g. lower than that of the main transceiver 203), so that the cost and implementation complexity of the auxiliary transceiver can be minimized.

When the auxiliary transceiver 205 is in operation, the main transceiver 203 and the auxiliary transceiver 205 work simultaneously in an FDMA (frequency division multiple access) manner. This means that the signal bandwidth is divided into two parts, i.e. one wideband part for the main transceiver 203 and one narrow band part for the auxiliary transceiver 205. When the auxiliary transceiver 205 is not in operation, the main transceiver 203 operates in the whole signal bandwidth.

In this disclosure it is assumed that the mm-wave wireless channel is reciprocal, implying that the TX and the RX share the same antenna array. However, the principle of this application can also be applied to cases without reciprocal channel, e.g. with separate antenna arrays for Tx and Rx.

Figures 3A, 3B:
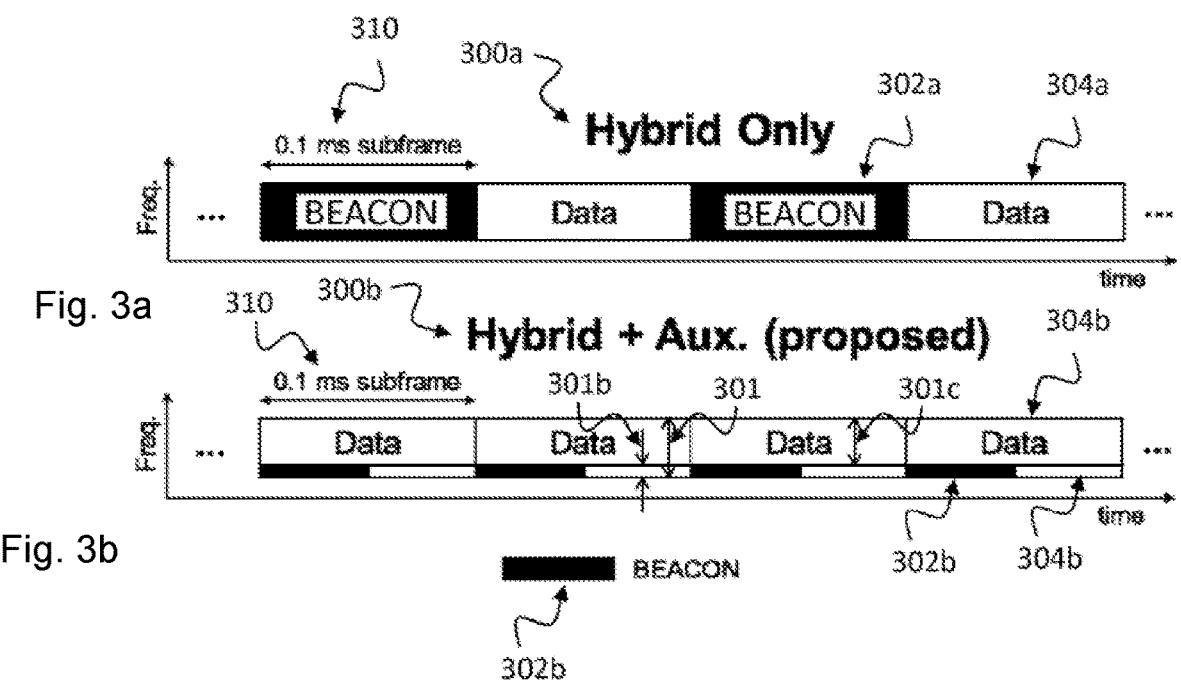
FIG. 3a shows a frequency-time diagram illustrating the frame structure 300a of a hybrid-only transceiver.
FIG. 3b shows a frequency-time diagram illustrating the frame structure 300b of a radio transceiving device with both hybrid transceiver and auxiliary fully digital transceiver according to an implementation form.

FIG. 3a shows a frequency-time diagram illustrating the frame structure 300a of a hybrid-only transceiver. The radio resource is divided in a time-division manner between transmission of beacon 302a and transmission of data 304a. During a first 0.1 ms subframe 310 a beacon 302a is transmitted, during the next subframe 310 data 304a is transmitted and so on.

FIG. 3b shows a frequency-time diagram illustrating the frame structure 300b of a radio transceiving device with both hybrid and auxiliary fully digital transceiver according to an implementation form. A first part 301c of the (full) bandwidth 301 is used for transmission of data 304b. A second part 301b of the (full) bandwidth 301 is divided in a frequency-division manner between transmission of beacon 302b and transmission of data 304b. This second part 301b of the bandwidth 301 is a small fraction of the full bandwidth 301, i.e. a small fraction of the total transceiver bandwidth 301 as can be seen from FIG. 3b. During a first part of a first 0.1 ms subframe 310 (e.g. the first half of the subframe 310) a beacon 302b is transmitted over this small fraction 301b of the bandwidth 301. During a second part of the first subframe 310 (e.g. the second half of the subframe 310) data 304b is transmitted over this small fraction 301b of the bandwidth 301 and so on.

The radio transceiving device 200 as described above with respect to FIG. 2 includes a main transceiver 203, e.g. a main wideband hybrid transceiver and an auxiliary transceiver 205, e.g. an auxiliary narrow band fully digital transceiver. Since the auxiliary transceiver 205 does not need GI for beam switching, it can have smaller BEACON 302b duration. Furthermore, during initial access procedure, the data transmission of the main transceiver 203 (for other associated users) is not interrupted, since the BEACON 302b of the auxiliary transceiver 205 only requires a small fraction 301b of the bandwidth 301. Thus, the transceiving device 200 according to the disclosure allows much lower BEACON overhead.

Figure 4:
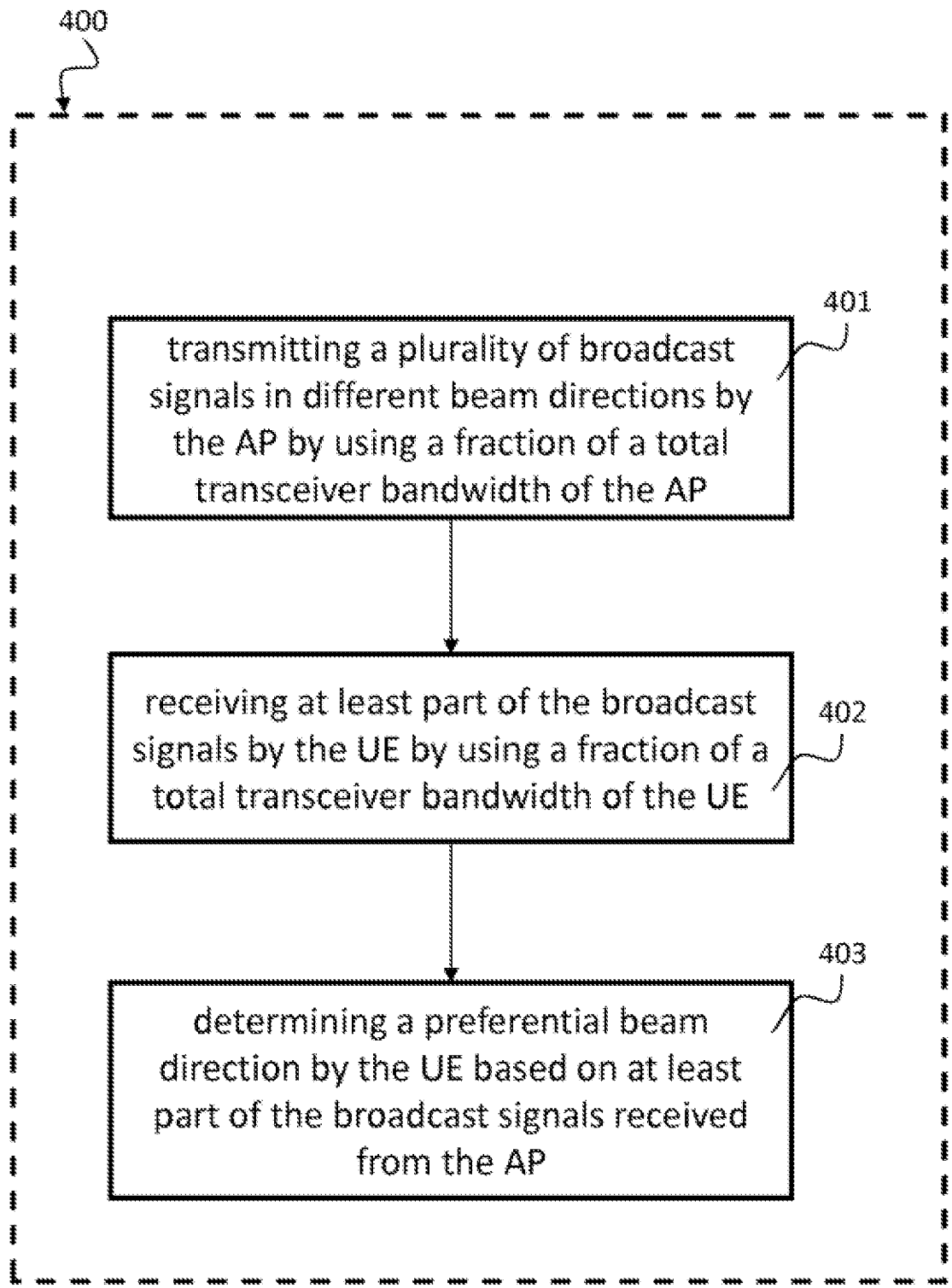
FIG. 4 shows a schematic diagram illustrating a method 400 for providing initial access between a user equipment (UE) and an access point (AP) according to an implementation form.

FIG. 4 shows a schematic diagram illustrating a method 400 for providing initial access between a user equipment (UE) and an access point (AP) according to an implementation form.

The method 400 includes transmitting 401 a plurality of broadcast signals in different beam directions by the AP by using a fraction of a total transceiver bandwidth of the AP. The AP can be an AP 110 as described above with respect to FIG. 1. The fraction of the total transceiver bandwidth may be a fraction 301b of the total transceiver bandwidth 301 according to the frame structure as described above with respect to FIG. 3b. The plurality of broadcast signals may include information about a beam sector identifier and a cell identifier of the AP.

The method 400 includes receiving 402 at least part of the broadcast signals by the UE by using a fraction 301b of a total transceiver bandwidth 301 of the UE. The method 400 further includes determining 403 a preferential beam direction by the UE 120 based on at least part of the broadcast signals received from the AP 110. These received broadcast signals may be the signals having the highest signal strength or having the highest signal-to-noise ratio (SNR).

The method 400 may include: determining beamforming coefficients by the UE 120 for the preferential beam direction; and transmitting a user data signal or a control signal over the total transceiver bandwidth 301 of the UE by using the beamforming coefficients determined by the UE.

The method 400 may include: scanning in different beam directions by the AP 110 by using the fraction 301b of the total transceiver bandwidth 301 of the AP 110 to detect an access request of the UE 120; determining beamforming coefficients by the AP 110 based on the detected access request of the UE 120; and transmitting a user data signal or a control signal over the total transceiver bandwidth 301 of the AP 110 by using the beamforming coefficients determined by the AP 110.

The method 400 may include: using an auxiliary transceiver 205 of a first radio transceiver device 200, e.g. as described above with respect to FIG. 2, for transmitting the plurality of broadcast signals by the AP 110; and using an auxiliary transceiver 205 of a second radio transceiver device 200, e.g. as described above with respect to FIG. 2, for receiving the at least part of the broadcast signals by the UE 120.

The determining 403 the preferential beam direction may be assisted by a base station (BS) including a BS transceiver operating on a different frequency, in particular a lower frequency than a frequency of the AP 110, for example a BS of an overlay network such as an LTE BS. The assistance by the base station may include signaling of corresponding control information by using the BS transceiver, e.g. as described below with respect to FIG. 8.

The method 400 may further include: determining a set of preambles, each associated to an AP 110, by the base station, in particular based on location information of the UE 120; and transmitting the set of preambles from the base station to the UE.

Figure 8:
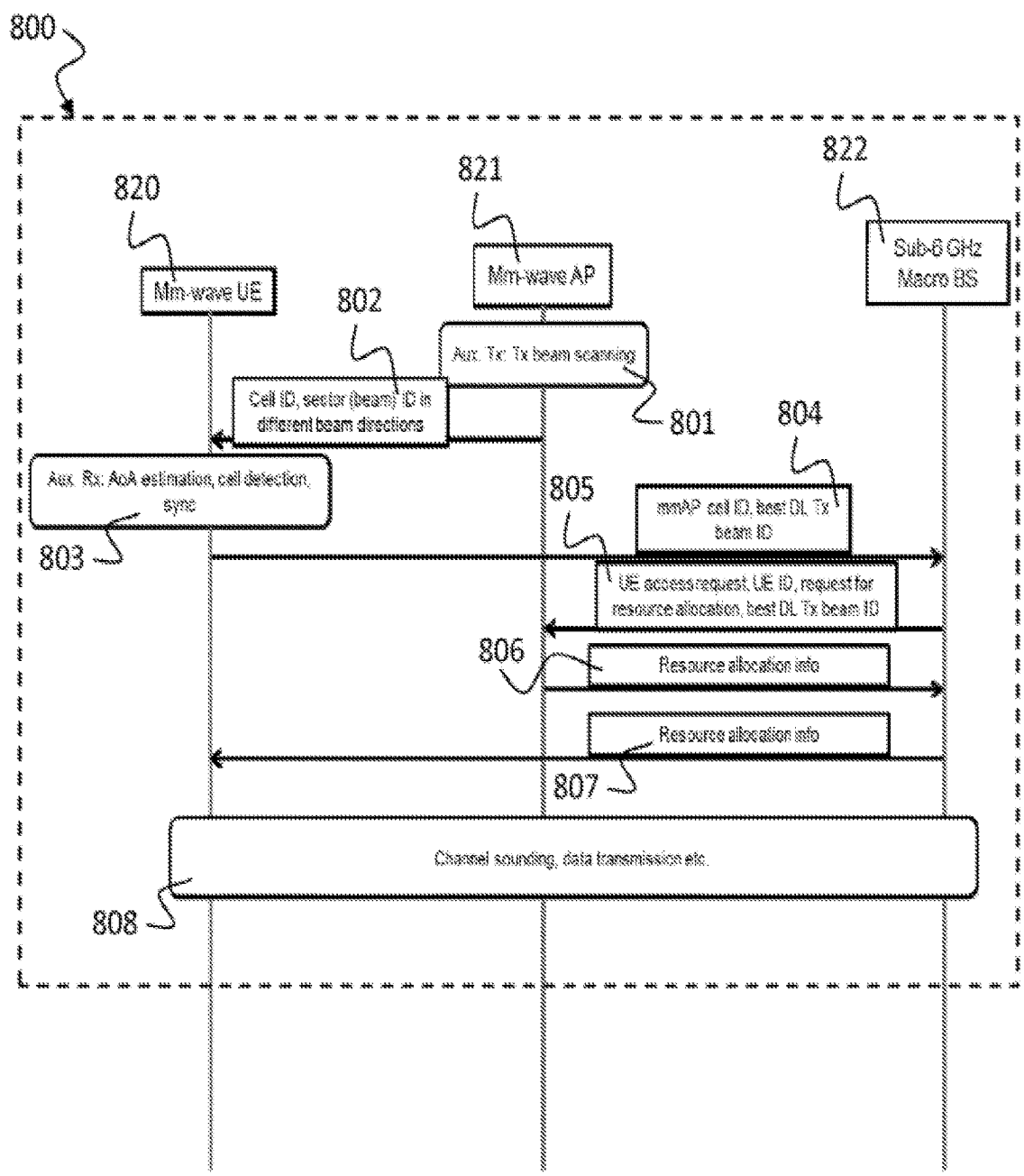
FIG. 8 shows a schematic diagram illustrating the signaling process 800 of initial access procedure under single cell scenario and in an overlay mm-wave network according to an implementation form.

The method 400 may include: transmitting a plurality of broadcast signals in different beam directions by a plurality of the APs by using a fraction 301b of a total transceiver bandwidth 301 of the APs; receiving at least part of the broadcast signals by the UE 120 by using a fraction 301b of a total transceiver bandwidth 301 of the UE 120; determining a preferential AP of the plurality of APs based on at least part of the broadcast signals received from the APs; and transmitting an access request by the UE 120 to the preferential AP, e.g. as described below with respect to FIG. 8.

The determining of the preferential AP may be assisted by the base station which BS transceiver operates on a different frequency, in particular a lower frequency than each of the APs, e.g. as described below with respect to FIG. 8.

The broadcast signals of different access points may include different preambles that are orthogonal to each other.

The method 400 may further include: determining a second and third preferential AP of the plurality of APs together with their beam sector identifiers and cell identifiers based on at least part of the broadcast signals received from the APs; and transmitting the beam sector identifiers and cell identifiers of the second and third preferential AP to the base station, e.g. as described below with respect to FIG. 8.

The method 400 may further include: sending an access request by the UE 120 to the AP 110 by using the preferential beam direction. A Random Access CHannel (RACH) for sending the access request may be located within the fraction 301b of the total transceiver bandwidth 301 of the UE 120.

Figure 5:
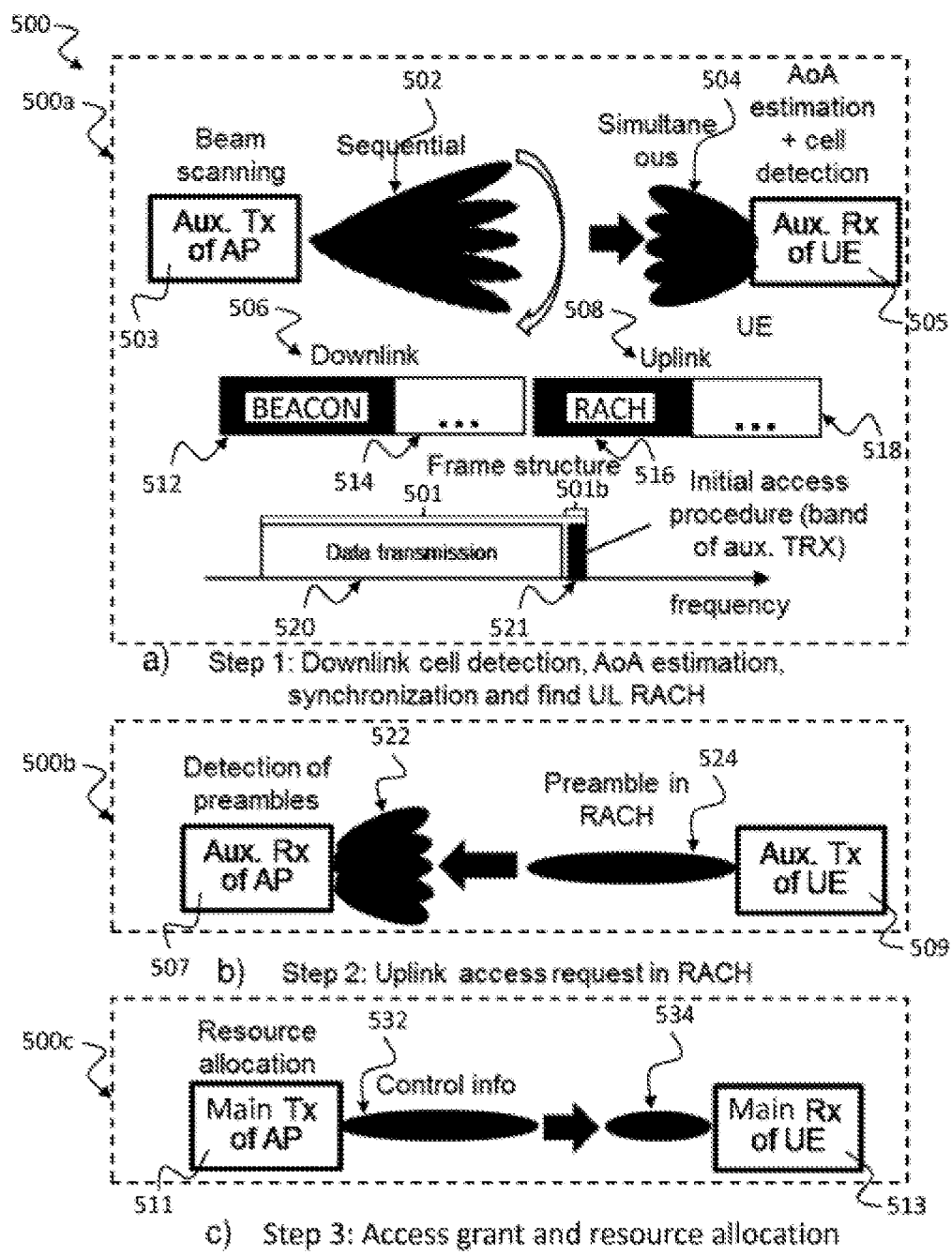
FIG. 5 shows a schematic diagram illustrating the steps 500a, 500b, 500c of initial access procedure 500 under single cell scenario and in a standalone mm-wave network according to an implementation form.

FIG. 5 shows a schematic diagram illustrating the steps 500a, 500b, 500c of initial access procedure 500 under single cell scenario and in a standalone mm-wave network according to an implementation form. The initial access procedure 500 is an implementation form of the method 400 described above with respect to FIG. 4 for the example of single cell access in a standalone mm-wave network.

Based on the new transceiver architecture as described above with respect to FIG. 2, the following initial access procedure 500 is introduced, which includes the following three steps:

Step 1: Downlink (DL) cell detection 500a. In this step 500a, the auxiliary TX 503 of AP sends BEACONs 512 periodically containing repeated signals in different beam sectors 502 (predefined beam directions). A BEACON 512 is a signal field that consists of a number of time slots, where in each time slot, a broadcast signal is transmitted towards a certain beam sector 502. The broadcast signal in each time slot contains a preamble for synchronization, the cell identity (ID) and beam sector ID. Alternatively, the cell ID may also be implicitly indicated by the preamble (cell specific preamble). Meanwhile, when a UE wants to access a mm-wave network, its auxiliary RX 505 performs frame detection for all possible RX beam directions 504 simultaneously, e.g. by doing angle of arrival (AoA) estimation and correlation with known preambles. After the UE has detected a preamble in a BEACON 512, performed time and frequency synchronization and decoded the control information in the BEACON 512, it identifies the location of the random access channel (RACH) 516 in the uplink frame 508. Further, from the decoded control information, the UE will know the cell ID and the best DL beam sector ID.

Step 2: Uplink (UL) access request during RACH 500b. The auxiliary TX 509 of the UE sends an access request 524 (e.g., a preamble like in LTE) in the RACH of the UL frame 508. For transmitting such access request 524, the UE uses the estimated RX beam direction (e.g. AoA) in previous step 500a for doing TX beamforming (BF). As an option, the UE can also send the best DL beam sector ID (identified from previous step 500a) after the preamble. Meanwhile, the auxiliary RX 507 of the AP senses all RX beam sectors 522 (beam directions) simultaneously to detect the UE access requests 524. From such sensing result (i.e. AoA estimation), or optionally from the best DL beam sector ID that the UE has fed back, the AP identifies the best DL beam sector. If there is contention, the contention resolution procedure can be done similar as in LTE.

Step 3: Access grant and resource allocation 500c. The main TX 511 of the AP performs TX beamforming according to the best DL beam sector ID and sends access grant related information 532, e.g. schedule of channel sounding/ estimation, resource allocation and optionally payload data, to the UE. Meanwhile, the main RX 513 of UE performs RX beamforming based on the best RX beam direction (identified in Step 1, 500a) to receive such control signal 532 and optionally payload data 534.

Figure 6:
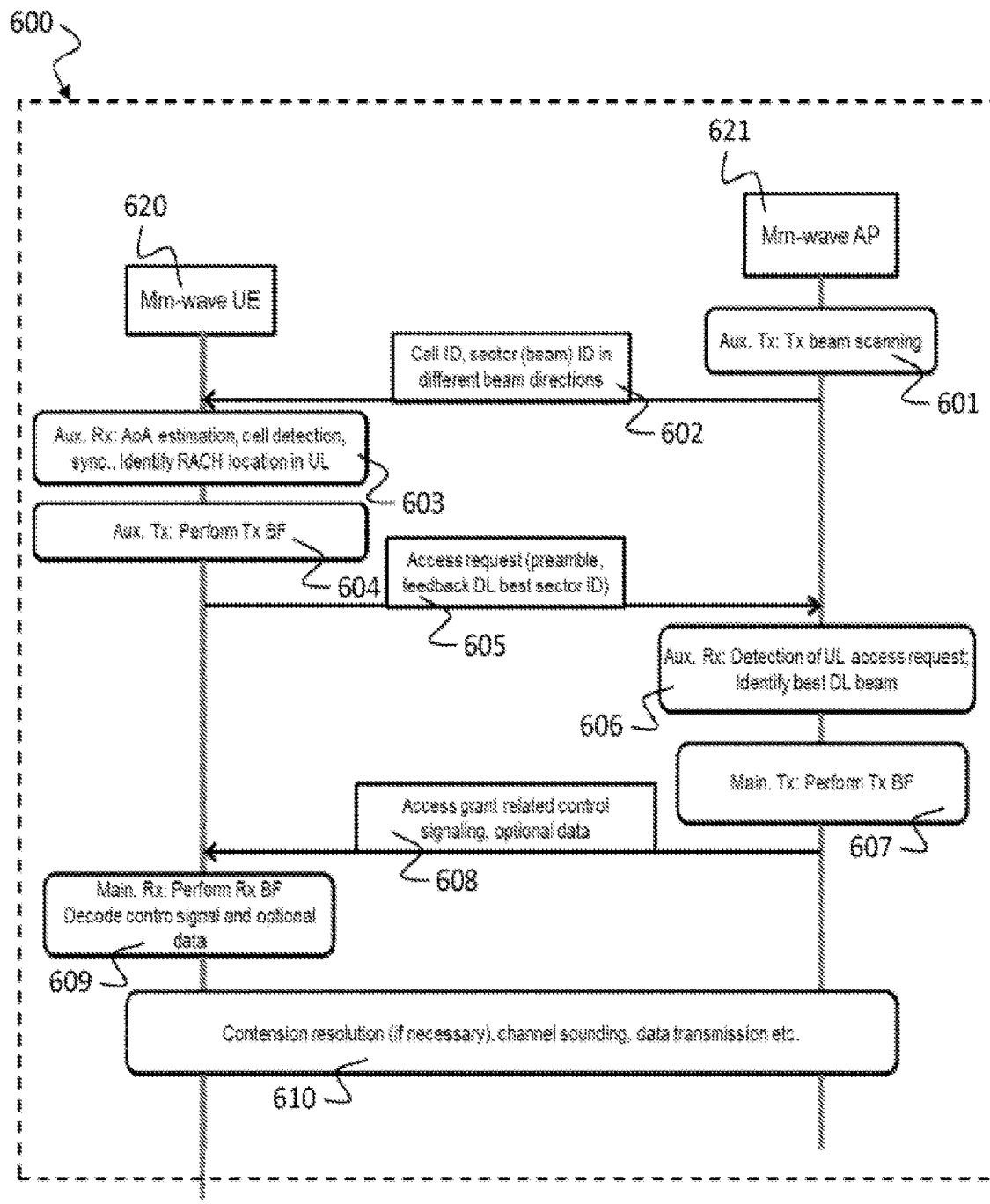
FIG. 6 shows a schematic diagram illustrating the signaling process 600 of initial access procedure under single cell scenario and in a standalone mm-wave network according to an implementation form.

FIG. 6 illustrates the detailed signaling process 600 of the above procedure for initial access between a mm-wave AP 621 and a mm-wave UE 620. The above steps 1 to 3 are subdivided into an exemplary number of ten steps as described in the following:

In a first step 601, the mm-wave AP 621 performs TX beam scanning by using the auxiliary TX. In a second step 602, the cell ID and sector (beam) ID are transmitted in different beam directions by mm-wave AP 621 to mm-wave UE 620. In a third step 603, the mm-wave UE 620 performs AoA estimation, cell detection, synchronization and identification of RACH location in UL by using the auxiliary RX. In a fourth step 604, the mm-wave UE 620 performs TX beamforming by using the auxiliary TX. In a fifth step 605, an access request message (including preamble, feedback DL best sector ID) is transmitted by mm-wave UE 620 to mm-wave AP 621.

In a sixth step 606 the mm-wave AP 621 performs detection of UL access request to identify the best DL beam by using the auxiliary RX. In a seventh step 607 the mm-wave AP 621 performs TX beamforming by using the main TX. In an eighth step 608, access grant related control signaling and optionally data are transmitted by mm-wave AP 621 to mm-wave UE 620. In a ninth step 609, the mm-wave UE 620 performs RX beamforming and decoding of control signal and optionally data by using the main RX.

In a tenth step 610, contention resolution is performed if necessary, channel sounding, data transmission etc. is performed between mm-wave AP 621 and mm-wave UE 620.

The above described method of initial access procedure 500, 600 under single cell scenario in a standalone mm-wave network may be extended to the multi-cell scenario in standalone network. In this scenario, it is assumed that the multiple mm-wave cells have rough mutual time synchronization. The initial access procedure includes the three steps as described in the following:

Step 1: Downlink (DL) cell detection. The auxiliary TX of multiple APs send BEACONs (where different beam sectors are scanned) with orthogonal preambles (similar to LTE). The time and duration of the BEACONs of different APs are roughly aligned in time domain. When a UE wants to have mm-wave access, its auxiliary Rx performs frame detection as in the single cell case but using all possible known preambles. Afterwards, the UE selects the AP with the maximum Rx power (e.g. according to correlation peak power of the preambles) and identifies the RACH channel of this best AP in uplink frame (based on the decoded BEACON information). As an option, the UE can record the cell ID and RACH channel position of the second (and third) best AP's as backup, e.g. in the case of blockage and link interruption, the UE can switch to the second best AP. Such switch can be done by performs Step 2 and Step 3 (described in the following) with the second (or third) best AP;

Step 2: Uplink (UL) access request during RACH. This step is the same as in the single cell scenario;

Step 3: Access grant and resource allocation. This step is the same as in the single cell scenario.

The above procedure assumes that the auxiliary transceivers of different AP's operate in the same narrow band. As an alternative, the auxiliary transceivers of different APs can also operate in different frequencies so that interference between the BEACONs of different APs can be avoided. In this case, the UE will perform the above steps in all possible narrow band frequencies.

Figure 7:
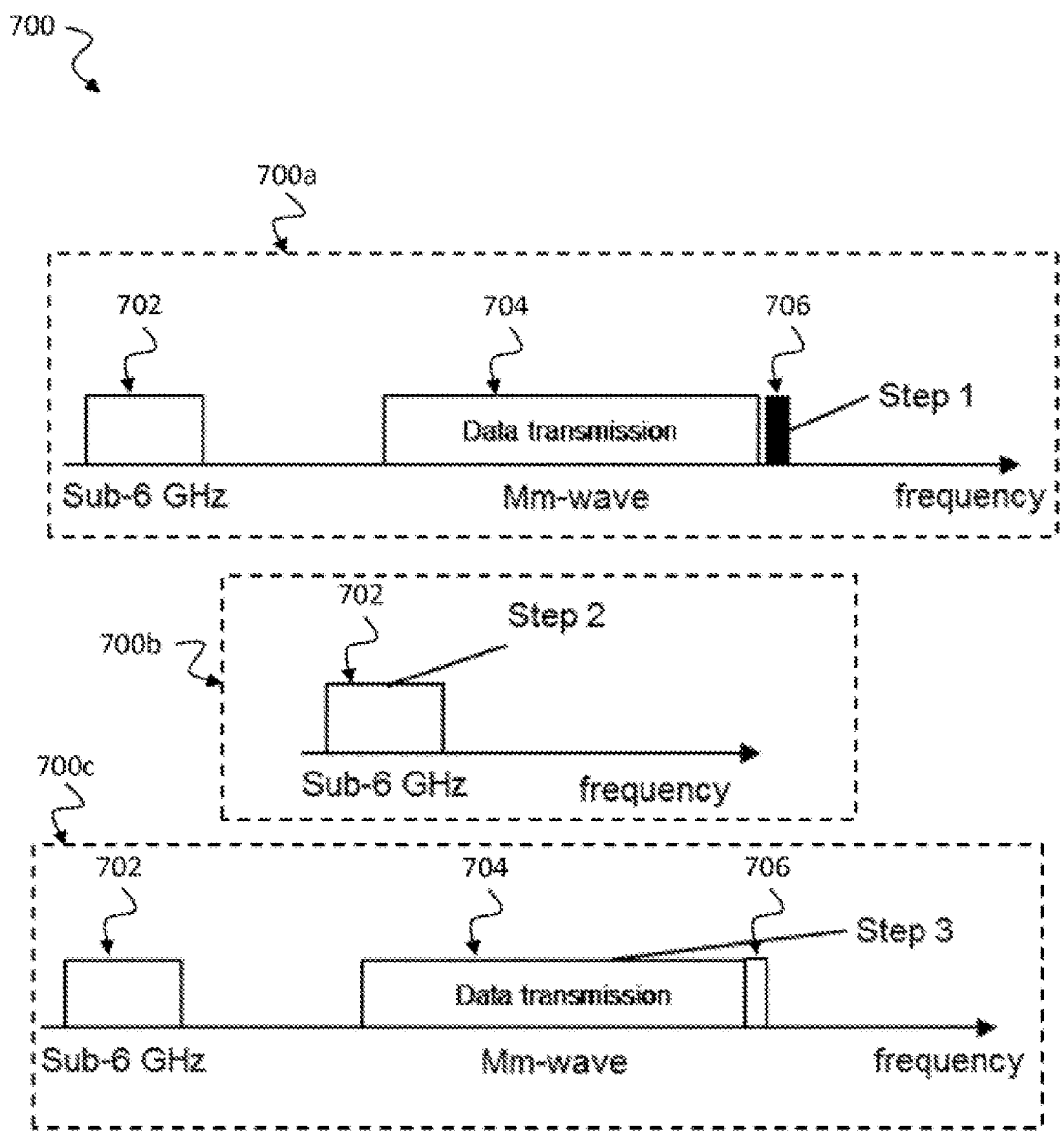
FIG. 7 shows a time diagram of the frequency usage illustrating the steps of initial access procedure 700 under single cell scenario and in an overlay mm-wave network according to an implementation form.

FIG. 7 shows a time diagram illustrating the steps of initial access procedure 700 under single cell scenario and in an overlay mm-wave network according to an implementation form.

In an overlay mm-wave network, a macro BS (MaBS) operating at sub-6 GHz frequencies 702 is coordinating all mm-wave APs (mmAP) and UEs within the coverage of the macro cell. The MaBS, the mmAP's and the UE's all have capability of wireless communication in sub-6 GHz 702. Before a UE wants to have mm-wave access, it has to be registered at the MaBS first. Thus, for mm-wave initial access, the control signalling can be done via connections between the MaBS and the UE at sub-6 GHz frequencies 702. Thus, in the following, the communication between the MaBS and the UE can be performed via sub-6 GHz links. The communication between the MaBS and the mmAP's can be done via backhaul, either in terms of wired or wireless communications. The mm-wave initial access includes the following steps:

Step 1: Downlink (DL) cell detection 700a. The UE informs the MaBS that he wants to have mm-wave access, or the MaBS has decided to let the UE initiate mm-wave transmission, e.g. based on the UE's data rate requirements. Then, as an option, the MaBS may tell the UE the starting time (and optionally, the duration) of the BEACONs of the mmAPs (under the assumption that the MaBS, the mmAP and the UE have rough time synchronization). The auxiliary TX of mmAP sends a BEACON where different beam sectors are scanned. Meanwhile, the auxiliary RX performs frame detection and synchronization to identify the best RX beam direction of UE, the best Tx beam sector of mmAP (from "BEAM sector ID" of the decoded BEACON field) and the mmAP cell ID (either from the decoded BEACON field or from preamble ID of the BEACON). Step 1, 700a can be performed over a fraction 706 of the transceiver bandwidth, e.g. by using the auxiliary transceiver structures as described above with respect to FIGS. 2 to 6.

Step 2: Access grant under assistance of MaBS, 700b. First, the UE feeds back the mmAP ID and best beam sector ID of the mmAP to the MaBS. Afterwards, the MaBS informs the mmAP about the best beam sector ID and let mmAP allocate resource for this UE. Then, the mmAP sends mm-wave resource allocation information to MaBS, and the MaBS forwards this information to the UE.

Step 3: The main transceiver of the mmAP and that of the UE perform beamforming based on the identified best beam direction for data transmission via main transceivers 700c. Step 3, 700c can be performed over the total transceiver bandwidth, e.g. by using the main transceiver structures as described above with respect to FIGS. 2 to 6.

FIG. 8 shows the corresponding signaling process of initial access procedure 800 for signaling initial access between a mm-wave AP 821 and a mm-wave UE 820 via a sub-6 GHz macro BS 822. The above steps 1 to 3 are subdivided into an exemplary number of eight steps as described in the following:

In a first step 801 the mm-wave AP 821 performs TX beam scanning by using the auxiliary TX. In a second step 802, the cell ID and sector (beam) ID are transmitted in different beam directions by mm-wave AP 821 to mm-wave UE 820. In a third step 603, the mm-wave UE 820 performs AoA estimation, cell detection and synchronization by using the auxiliary RX. In a fourth step 804, a message including mmAP cell ID, best DL TX beam ID is transmitted by mm-wave UE 820 to sub-6 GHz macro BS 822.

In a fifth step 805 a UE access request message including UE ID, request for resource allocation, best DL TX beam ID is transmitted by sub-6 GHz macro BS 822 to mm-wave AP 821. In a sixth step 806, a message including resource allocation information is transmitted by mm-wave AP 821 to sub-6 GHz macro BS 822. In a seventh step 807, a message including resource allocation information is transmitted by sub-6 GHz macro BS 822 to mm-wave UE 820.

In an eighth step 808, channel sounding, data transmission etc. is performed between mm-wave AP 821, mm-wave UE 820 and sub-6 GHz macro BS 822.

The above described method of initial access procedure 700, 800 under single cell scenario in an overlay mm-wave network may be extended to the multi-cell scenario in an overlay mm-wave network. In this scenario, it the MaBS, the mmAP and the UE may have rough time synchronization. The initial access procedure includes the three steps as described in the following:

Step 1: Downlink (DL) cell detection. First, as option, the MaBS may send a list of candidate mmAP (or their cell specific preambles) to the UE, e.g. based on the UE location and the known mmAP locations. Another option is that the MaBS also tells the UE the starting time (and optionally, the duration) of the BEACONs of the mmAPs. Then, the UE perform the same operations as in step 1 of the multi-cell standalone scenario. If the UE knows the candidate mmAP's preambles, such operations are done based on such preambles (instead of all possible preambles).

Step 2: Access grant under assistance of MaBS. The UE feeds back selected best mmAP cell ID and the best beam sector ID to the MaBS. As an option, the UE may also feedback such information about the second (and as a further option, the third) best mmAP. Afterward, the MaBS informs the best mmAP about the best beam sector ID and let this mmAP allocate resource for this UE. Then, the mmAP sends mm-wave resource allocation information to MaBS, and the MaBS forwards this information to the UE. As an option, the MaBS may also select one mmAP from the several best candidates based on their load situation, and inform the UE about the selected mmAP ID.

Step 3: The main transceiver of the mmAP and that of the UE perform beamforming based on the identified best beam direction for data transmission via main transceivers.

In the case of blockage or link interruption, the UE requests the MaBS select a backup mmAP, e.g., from the second/third best mmAPs and require the selected mmAP to allocate resource for this UE.

The above procedure assumes that the auxiliary transceivers of different APs operate in the same narrow band. As an alternative, the auxiliary transceivers of different APs can also operate in different frequencies so that interference between the BEACON's of different AP's can be avoided. In this case, the MaBS will inform the UE about the narrow band frequencies of the different mmAPs in Step 1.

For large bandwidth, the beamforming coefficients for the narrow band auxiliary transceiver may not be optimal for the whole bandwidth, i.e. for the frequencies far away from the frequencies of the auxiliary transceiver, the beam direction may have considerable deviation. This problem can be mitigated by further optimization of the beamforming coefficients of the main transceiver based on the knowledge of location of the narrow band spectrum of the auxiliary transceiver within the overall signal bandwidth.

The transceiving device according to the disclosure can also be easily implemented in a fully digital architecture, where the signal bandwidth is just divided into two parts as described above. However, in a fully digital architecture, no auxiliary transceiver is necessary.

In the numerical results illustrated in FIGS. 9 to 12, it is shown that by doing the above bandwidth division, the average beam alignment delay can even be lower than that of the fully digital case without bandwidth division. Furthermore, for fully digital implementation which divides the signal processing into a part that is close to the antennas and a part that is in a remote server, this transceiving device provides a simplified implementation possibility of initial access.

In the numerical evaluations illustrated in FIGS. 9 to 12, the following system parameters are applied:

Single cell case (standalone or overlay);
Phase shifters needs 0.5-10 us for analog beam switching;
AP and UE have 64 and 16 beam sectors to be scanned, respectively;
Hybrid transceiver can have shared- or sub-array architecture, with up to 8 RF/digital chains at the AP and 1 RF/digital chain at the UE;
The auxiliary transceiver bandwidth can be 100 kHz, 1 MHz, or 10 MHz;

The BEACON requires 64 bits control information (e.g. Cell ID and beam sector ID) for each beam sector.

Subframe length: 0.1 ms.

The information bits in each beam sector of a BEACON can be written as:

$$Ibc = W \log 2(1+SNRb)t, \text{ where}$$

T: duration of each beam;
W: bandwidth;
SNRb: expected SNR of the received signal in each beam sector;

The SNR with omni transmission are denoted as SNR0. Then, there is SNRb=SNR0*Nt*Nr if having Nt and Nr Tx and Rx beam sectors, respectively.

Figures 10A, 10B, 10C:
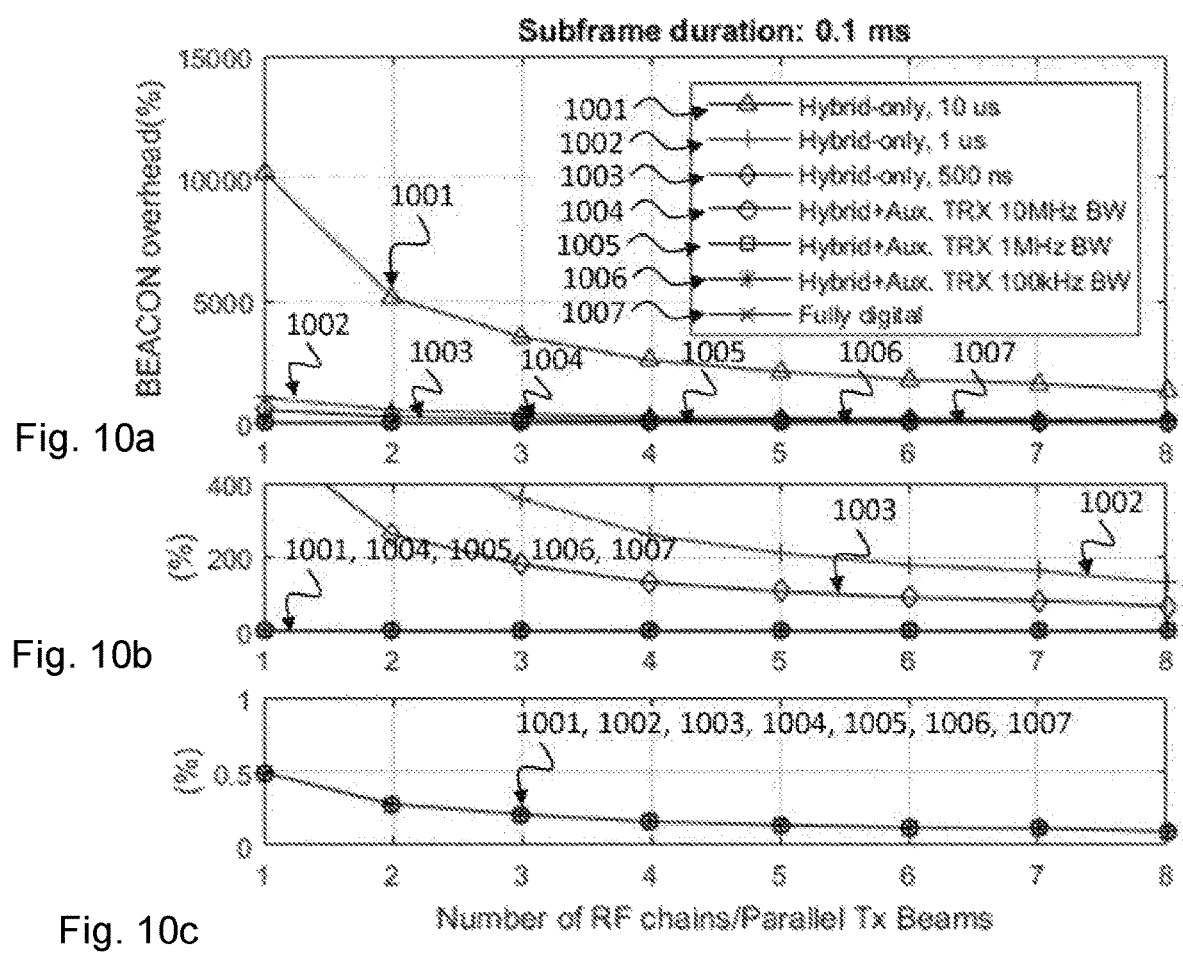
FIGS. 10a, 10b and 10c show diagrams illustrating an exemplary BEACON overhead of different schemes.
Figure 11A:
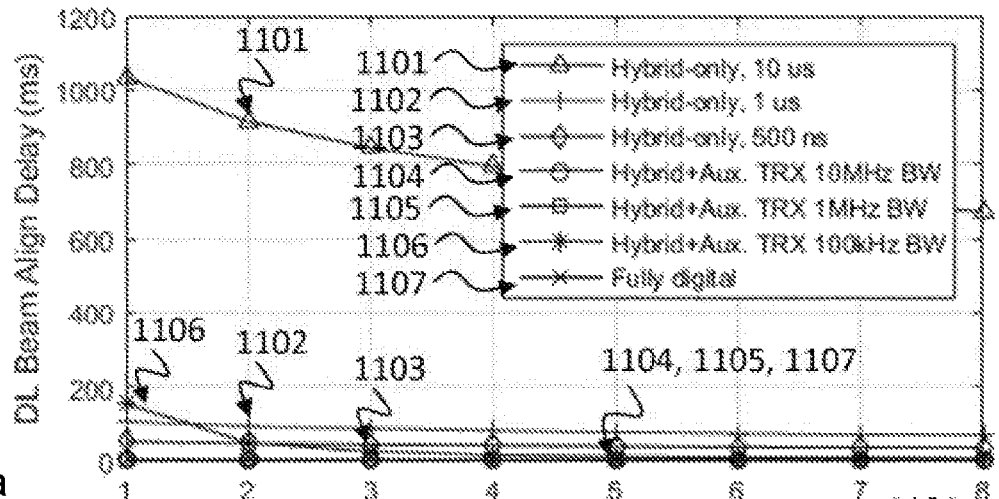
FIGS. 11a, 11b, 11c and 11d show diagrams illustrating an exemplary DL beam alignment average delay using the BEACON overhead of the fully digital architecture.
Figure 11B:
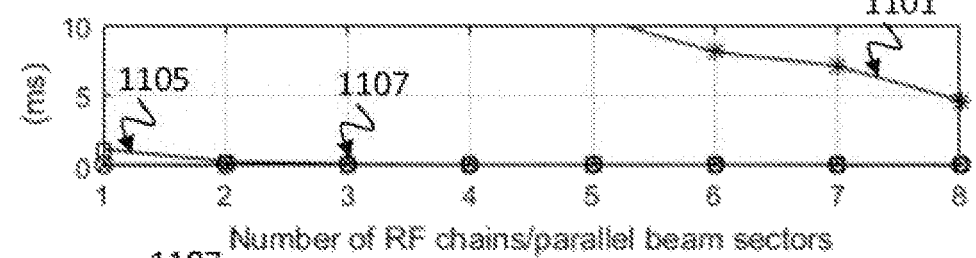
Figure 11C:
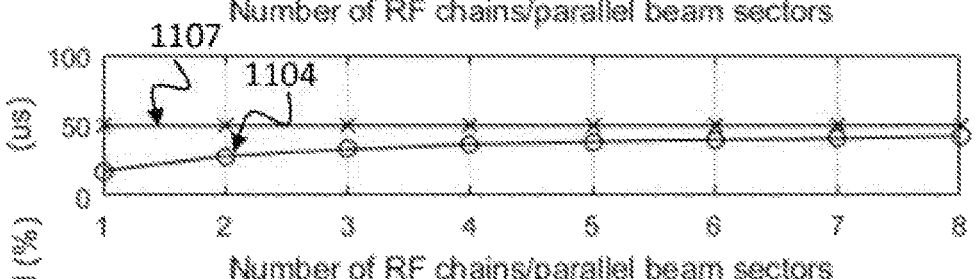
Figure 11D:
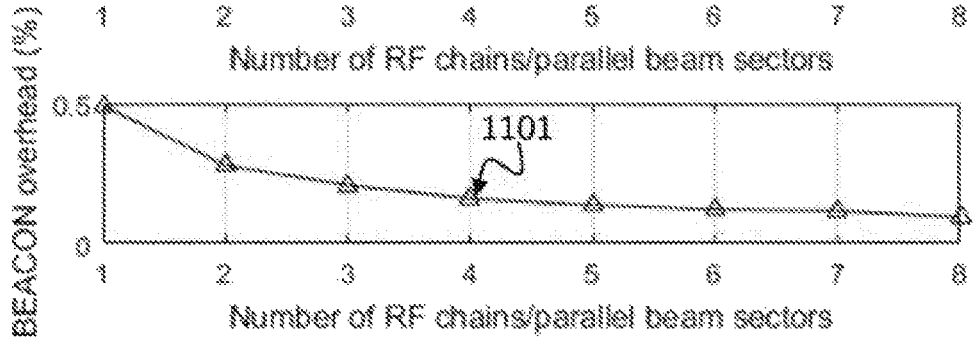

Accordingly, the BEACON duration can be calculated as follows:

Hybrid only scheme: Nt*Nr*max(t,100 us)/Nrf, where Nrf is the number of RF chains;
Auxiliary assisted scheme according to the disclosure: Nt*t;

FIGS. 9a and 9b show diagrams illustrating an exemplary BEACON duration of different schemes and FIGS. 10a, 10b and 10c show diagrams illustrating an exemplary BEACON overhead of different schemes.

The hybrid-only scheme with 10 us is referred to as 901, 1001. The hybrid-only scheme with 1 us is referred to as 902, 1002. The hybrid-only scheme with 500 ns is referred to as 903, 1003. The auxiliary assisted scheme with 10 MHz TX bandwidth is referred to as 904, 1004. The auxiliary assisted scheme with 1 MHz TX bandwidth is referred to as 905, 1005. The auxiliary assisted scheme with 100 kHz TX bandwidth is referred to as 906, 1006. The fully digital scheme is referred to as 907, 1007.

FIGS. 9 and 10 show the BEACON duration and overhead of different schemes with different parameters, respectively. As shown, the BEACON overheads of the auxiliary assisted schemes are much lower than that of the hybrid-only schemes. The BEACON overhead remains the same for different bandwidths of the auxiliary transceiver. Moreover, the auxiliary assisted scheme according to the disclosure has the same BEACON overhead as the fully digital case (below 0.5%). The BEACON duration of the auxiliary assisted scheme depends on the bandwidth of the auxiliary transceiver. Under some configurations, the auxiliary assisted scheme has longer BEACON duration than the hybrid-only cases. However, as will be shown later, longer BEACON duration can enhance the beam alignment probability, i.e. reduce the beam alignment delay. Furthermore, for hybrid-only approach, since BEACON duration is larger than subframe duration (e.g. 0.1 ms), it is not possible to include the complete BEACON in a subframe. This means that the BEACON has to be split over multiple subframes with breaks in between for data transmission or larger subframe has to be used. Both imply increased initial access delay. It should be reminded that for hybrid-only schemes, BEACON duration equals the duration of data transmission interruption. In contrast, with the auxiliary assisted scheme according to the disclosure, data transmission is not interrupted during BEACON, but just with slightly reduced data bandwidth.

FIGS. 11a, 11b, 11c and 11d show diagrams illustrating an exemplary DL beam alignment average delay using the BEACON overhead of the fully digital architecture and FIGS. 12a, 12b, 12c and 12d show diagrams illustrating an exemplary DL beam alignment average delay assuming 40% BEACON overhead for all schemes.

The hybrid-only scheme with 10 us is referred to as 1101, 1201. The hybrid-only scheme with 1 us is referred to as 1102, 1202. The hybrid-only scheme with 500 ns is referred to as 1103, 1203. The auxiliary assisted scheme with 10 MHz TX bandwidth is referred to as 1104, 1204. The auxiliary assisted scheme with 1 MHz TX bandwidth is referred to as 1105, 1205. The auxiliary assisted scheme with 100 kHz TX bandwidth is referred to as 1106, 1206. The fully digital scheme is referred to as 1107, 1207.

FIGS. 11 and 12 show the average beam alignment delay using the BEACON overhead of the fully digital case or fixing the BEACON overhead to 40%, respectively. As shown, the disclosed auxiliary assisted schemes have much lower beam alignment delay than the hybrid-only schemes. Moreover, under a certain configuration (10 MHz auxiliary transceiver bandwidth), the beam alignment delay can even be lower than that of the fully digital case.

The present disclosure also relates to a computer program being configured to implement the methods described above when executed on a computer.

The present disclosure also supports a computer program product including computer executable code or computer executable instructions that, when executed, causes at least one computer to execute the performing and computing steps described herein, in particular the steps of the methods 400, 500 described above. Such a computer program product may include a readable non-transitory storage medium storing program code thereon for use by a computer. The program code may perform the performing and computing steps described herein, in particular the methods 400 and 500 as described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the application beyond those described herein. While the present application has been described with reference to one or more particular embodiments, those skilled in the art recognize that many changes may be made thereto without departing from the scope of the present application. It is therefore to be understood that within the scope of the appended claims and their equivalents, the application may be practiced otherwise than as specifically described herein.

What is claimed is:

1. A radio transceiving device, comprising:
a multi-antenna array;
a main transceiver coupled to the multi-antenna array, wherein the main transceiver is configured to beamform a first plurality of digital signals over a total transceiver bandwidth, wherein a part of the beamforming is processed in a digital domain and another part of the beamforming the first plurality of digital signals is processed in an analog domain; and
an auxiliary transceiver coupled to the multi-antenna array, wherein the auxiliary transceiver is configured to beamform a second plurality of digital signals over a fraction of the total transceiver bandwidth, wherein the beamforming the second plurality of digital signals is processed in the digital domain;
wherein the auxiliary transceiver is configured to provide initial access for a user equipment to an access point; and
wherein the main transceiver is configured to perform user data transmission between the user equipment and the access point.

2. The radio transceiving device of claim 1, wherein the auxiliary transceiver is configured to provide the initial access for the user equipment to the access point based on aligning at least one beam of the user equipment with at least one beam of the access point.

3. The radio transceiving device of claim 1,
wherein the auxiliary transceiver is configured to provide small packet transmission.

4. The radio transceiving device of claim 1,
wherein the main transceiver and the auxiliary transceiver are configured to share the total transceiver bandwidth based on frequency division multiple access (FDMA) on demand, during initial access or small packet transmission; and otherwise to assign the total transceiver bandwidth to the main transceiver.

5. The radio transceiving device of claim 1,
wherein the main transceiver comprises a plurality of analog processing chains, comprising analog phase shifters coupled to the multi-antenna array, and a plurality of digital processing chains, and comprising digital-to-analog converters (DACs) and/or analog-to-digital converters (ADCs) coupled via the analog processing chains to the multi-antenna array, wherein a number of the digital processing chains is smaller than a number of the analog processing chains.

6. The radio transceiving device of claim 5,
wherein the auxiliary transceiver comprises a plurality of digital processing chains, comprising DACs and/or ADCs, wherein a quantization resolution of the DACs and/or ADCs of the auxiliary transceiver is lower than a quantization resolution of the DACs and/or ADCs of the main transceiver.

7. The radio transceiving device of claim 5,
wherein each digital processing chain of the main transceiver is connected to all antenna elements of the multi-antenna array via the analog phase shifters; or wherein each digital processing chain of the main transceiver is connected to a subset of the antenna elements of the multi-antenna array via the analog phase shifters.

8. The radio transceiving device of claim 5, wherein the auxiliary transceiver is only coupled to a subset of the antenna elements of the multi-antenna array.

9. A method for providing initial access between a user equipment (UE) and an access point (AP), the method comprising:
transmitting a plurality of broadcast signals in different beam directions by the AP using a fraction of a total transceiver bandwidth of the AP, wherein the plurality of broadcast signals comprise information about a beam sector identifier and a cell identifier of the AP;
receiving at least part of the broadcast signals by the UE using a fraction of a total transceiver bandwidth of the UE;
determining a preferential beam direction by the UE based on at least part of the broadcast signals received from the AP;
using an auxiliary transceiver of a first radio transceiver device for transmitting the plurality of broadcast signals by the AP; and
using an auxiliary transceiver of a second radio transceiver device for receiving the at least part of the broadcast signals by the UE.

10. The method of claim 9, comprising:
determining beamforming coefficients by the UE for the preferential beam direction; and
transmitting a user data signal or a control signal over the total transceiver bandwidth of the UE using the beamforming coefficients determined by the UE.

11. The method of claim 9, comprising:
scanning in different beam directions by the AP using the fraction of the total transceiver bandwidth of the AP to detect an access request of the UE;
determining beamforming coefficients by the AP based on the detected access request of the UE; and
transmitting a user data signal or a control signal over the total transceiver bandwidth of the AP by using the beamforming coefficients determined by the AP.

12. The method of claim 9, wherein the determining the preferential beam direction is assisted by a base station (BS) comprising a BS transceiver operating on a different frequency, comprising a lower frequency than a frequency of the AP, wherein the assistance by the base station comprises signaling of corresponding control information using the BS transceiver.

13. The method of claim 12, comprising:
determining a set of preambles, each associated to an AP, by the base station, based on location information of the UE; and
transmitting the set of preambles from the base station to the UE.

14. The method of claim 12, comprising:
transmitting a plurality of broadcast signals in different beam directions by a plurality of the APs using a fraction of a total transceiver bandwidth of the APs;
receiving at least part of the broadcast signals by the UE using a fraction of a total transceiver bandwidth of the UE;
determining a preferential AP of the plurality of APs based on at least part of the broadcast signals received from the APs; and
transmitting an access request by the UE to the preferential AP.

15. The method of claim 14, wherein the determining the preferential AP is assisted by the base station which BS transceiver operates on a different frequency, comprising a lower frequency than each of the APs.

16. The method of claim 14, wherein the broadcast signals of different access points comprise different preambles that are orthogonal to each other.

17. The method of claim 14, comprising:
determining a second and third preferential AP of the plurality of APs together with their beam sector identifiers and cell identifiers based on at least part of the broadcast signals received from the APs; and
transmitting the beam sector identifiers and cell identifiers of the second and third preferential AP to the base station.

18. The method of claim 9, comprising:
sending an access request by the UE to the AP using the preferential beam direction,
wherein a Random Access CHannel (RACH) for sending the access request is located within the fraction of the total transceiver bandwidth of the UE.

* * * * *